United States Patent
Wang et al.

(10) Patent No.: US 12,156,240 B2
(45) Date of Patent: Nov. 26, 2024

(54) SCHEDULING METHOD AND APPARATUS IN COMMUNICATION SYSTEM, AND STORAGE MEDIUM

(71) Applicant: HUAWEI TECHNOLOGIES CO., LTD., Shenzhen (CN)

(72) Inventors: Jian Wang, Hangzhou (CN); Chen Xu, Hangzhou (CN); Rong Li, Hangzhou (CN); Dali Qin, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 484 days.

(21) Appl. No.: 17/471,640

(22) Filed: Sep. 10, 2021

(65) Prior Publication Data
US 2021/0410161 A1    Dec. 30, 2021

Related U.S. Application Data

(63) Continuation of application No. PCT/CN2020/077227, filed on Feb. 28, 2020.

(30) Foreign Application Priority Data

Mar. 15, 2019    (CN) .......................... 201910199878.5

(51) Int. Cl.
*H04W 72/50*    (2023.01)
*H04L 1/1812*    (2023.01)

(52) U.S. Cl.
CPC ......... *H04W 72/535* (2023.01); *H04L 1/1812* (2013.01)

(58) Field of Classification Search
CPC .. H04W 72/535; H04L 1/1812; H04L 1/1854; H04L 5/0055; H04L 2001/0093; G06N 3/08; G06N 3/006
See application file for complete search history.

(56) References Cited

U.S. PATENT DOCUMENTS

2003/0217081 A1    11/2003    White et al.
2004/0049354 A1    3/2004    Loraine et al.
(Continued)

FOREIGN PATENT DOCUMENTS

CN    101600229 A    12/2009
CN    101695050 A    4/2010
(Continued)

OTHER PUBLICATIONS

Shenghe Xu et al., "Realtime Scheduling and Power Allocation Using Deep Neural Networks", arxiv.org, Cornell University Library, 201 Olin Library Cornell University Ithaca, NY 14853, Nov. 18, 2018, XP081051734, 5 pages.

*Primary Examiner* — Donald L Mills
(74) *Attorney, Agent, or Firm* — Maier & Maier, PLLC

(57) ABSTRACT

According to a scheduling method and apparatus in a communication system, and a storage medium, a communication device obtains system status information, where the system status information includes network status information; obtains a scheduling policy based on the system status information and a deep neural network; and performs communication according to the scheduling policy. The deep neural network is obtained through training based on historical system status information, and the historical system status information includes system status information in all scheduling periods before a current scheduling period. Therefore, the scheduling policy obtained based on the deep neural network can meet a balancing requirement of throughput and fairness and solves a problem of low performance of an existing communication system.

18 Claims, 17 Drawing Sheets

(56) References Cited

U.S. PATENT DOCUMENTS

| | | | |
|---|---|---|---|
| 2007/0058557 | A1 | 3/2007 | Cuffaro et al. |
| 2015/0326553 | A1 | 11/2015 | Flynn et al. |
| 2016/0044673 | A1* | 2/2016 | Liu ...................... H04W 16/02 370/329 |
| 2018/0315473 | A1 | 11/2018 | Yu et al. |
| 2019/0372644 | A1* | 12/2019 | Chen .................... H04W 88/12 |
| 2021/0258988 | A1* | 8/2021 | Balakrishnan ........... G06N 3/08 |
| 2021/0329533 | A1* | 10/2021 | Kim ..................... H04W 48/12 |
| 2021/0352706 | A1* | 11/2021 | Kang ................... H04L 5/0082 |

FOREIGN PATENT DOCUMENTS

| | | |
|---|---|---|
| CN | 103002589 A | 3/2013 |
| CN | 105808454 A | 7/2016 |
| CN | 106027463 A | 10/2016 |

\* cited by examiner

SCHEDULING METHOD AND APPARATUS IN COMMUNICATION SYSTEM, AND STORAGE MEDIUM

CROSS-REFERENCE TO RELATED APPLICATIONS

This application is a continuation of International Patent Application No. PCT/CN2020/077227, filed on Feb. 28, 2020, which claims priority to Chinese Patent Application No. 201910199878.5, filed on Mar. 15, 2019. The disclosures of the aforementioned applications are hereby incorporated by reference in their entireties.

TECHNICAL FIELD

The embodiments relate to the field of communication technologies, and in particular, to a scheduling method and apparatus in a communication system, and a storage medium.

BACKGROUND

In a wireless communication system, scheduling at a media access control (MAC) layer is mainly used to resolve problems such as time-frequency domain resource allocation, power control, modulation and coding scheme (MCS) selection, user pairing, and precoding matrix calculation, to implement a balance between throughput and fairness in a communication system.

In the conventional technology, in a MAC layer-based scheduling method, the communication system is mainly used as a determined model, and a scheduling solution is obtained by using a scheduling algorithm, so that a terminal device implements scheduling based on the obtained scheduling solution. For example, in a resource block group (RBG) allocation process in a cellular network, the scheduling solution may be determined by using a proportional fair (PF) algorithm, to implement a tradeoff between the throughput and the fairness.

However, because the communication system is relatively complex, the scheduling solution obtained based on the foregoing algorithm cannot meet a balancing requirement between the throughput and the fairness, and performance of the communication system is low.

SUMMARY

Embodiments provide a scheduling method and apparatus in a communication system, and a storage medium, to resolve a problem of low performance of an existing communication system.

A first aspect provides a scheduling method in a communication system. A communication device first obtains system status information, where the system status information includes network status information; then obtains a scheduling policy based on the system status information and a deep neural network, where the deep neural network is obtained through training based on historical system status information, and the historical system status information includes system status information in all scheduling periods before a current scheduling period; and performs communication according to the scheduling policy.

In this embodiment, the deep neural network is obtained through training based on the historical system status information, and the historical system status information includes the system status information in all the scheduling periods before the current scheduling period. Therefore, the scheduling policy obtained based on the method can meet a balancing requirement of throughput and fairness and improve performance of the communication system.

For example, the system status information further includes historical throughput information and user buffer status information.

In a possible implementation of the first aspect, that a communication device obtains a scheduling policy based on the system status information and a deep neural network includes:
  determining estimated throughput information based on the network status information and the user buffer status information;
  inputting the estimated throughput information and the historical throughput information into the deep neural network to obtain a scheduling weight; and
  determining the scheduling policy based on the scheduling weight.

In this embodiment, the communication device first calculates the estimated throughput information, then inputs the estimated throughput information and the historical throughput information into the deep neural network to obtain the scheduling weight, and finally obtains the scheduling policy. This reduces processing pressure of the system and improves system stability.

In the foregoing possible implementation of the first aspect, the system status information further includes hybrid automatic repeat request (HARQ) information; and the determining the scheduling policy based on the scheduling weight includes:
  determining the scheduling policy based on the scheduling weight and the HARQ information.

In this embodiment, after the scheduling weight of each user is determined by using the deep neural network, scheduling priorities of all to-be-scheduled users are adjusted by considering the HARQ information, so that transmission of retransmission information about to expire may be preferably ensured. That is, the scheduling policy determined based on the scheduling weight and the HARQ information can implement scheduling fairness.

In another possible implementation of the first aspect, that a communication device obtains a scheduling policy based on the system status information and a deep neural network includes:
  determining estimated throughput information based on the network status information and the user buffer status information; and
  inputting the estimated throughput information and the historical throughput information into the deep neural network to obtain the scheduling policy.

In this embodiment, input of the deep neural network is the estimated throughput information and the historical throughput information, and output of the deep neural network is the scheduling policy. In this way, the system performance of the communication device having the deep neural network is relatively good.

In yet another possible implementation of the first aspect, that a communication device obtains a scheduling policy based on the system status information and a deep neural network includes:
  inputting the system status information into the deep neural network to obtain the scheduling policy.

In this embodiment, the obtained system status information is all input into the deep neural network, to reduce complexity of the communication system and improve the performance of the communication system. However, this solution has a relatively high requirement for the deep neural network, consumes a relatively large quantity of resources, and has a relatively slow processing speed.

In still another possible implementation of the first aspect, that a communication device obtains a scheduling policy based on the system status information and a deep neural network includes:
  inputting the system status information into the deep neural network to obtain a scheduling weight; and
  determining the scheduling policy based on the scheduling weight.

In this embodiment, the scheduling weight is first obtained based on the system status information, and then the scheduling policy is determined based on the scheduling weight. In this way, pressure of the deep neural network can be reduced, the performance of the communication system can be improved, and a tradeoff between user throughput and the fairness is implemented.

In the foregoing possible implementations of the first aspect, the system status information input into the deep neural network further includes HARQ information.

In any one of the foregoing possible implementations of the first aspect, the method further includes:
  obtaining current system throughput information, current fairness parameter information, and updated system status information that are obtained after the scheduling policy is executed; and
  determining payoff information based on at least one of the following parameters: the current system throughput information, the current fairness parameter information, a system packet loss rate, and a system delay, where the payoff information is used to adjust a decision of the deep neural network in a next scheduling period.

In this embodiment, one piece of payoff information is determined for subsequent update of the deep neural network, so that reasonableness of a scheduling policy in a subsequent scheduling period can be improved.

Optionally, the method further includes:
  storing the system status information, the scheduling policy, the updated system status information, and the payoff information, where the system status information, the scheduling policy, the updated system status information, and the payoff information are used to update the deep neural network. The communication device may use the obtained system status information, the obtained scheduling policy, the updated system status information, and the corresponding payoff information as an experience for storage, and further train or update the deep neural network by using the experience.

In a possible implementation of the first aspect, the communication device is a network device, and that a communication obtains system status information includes:
  obtaining the network status information and acknowledgment or non-acknowledgment (ACK/NACK) information that are determined by at least one terminal device;
  updating the HARQ information based on the ACK/NACK information; and
  obtaining the user buffer status information and the historical throughput information.

For downlink transmission in the communication system, the network device may obtain the network status information and the ACK/NACK information that are determined by the at least one terminal device, update the HARQ information based on the ACK/NACK information, and obtain the user buffer status information and the historical throughput information. That is, the system status information of the communication system is obtained. This lays a foundation for determining a reasonable scheduling policy.

In another possible implementation of the first aspect, the communication device is a network device, and that a communication device obtains system status information includes:
  obtaining the user buffer status information and the HARQ information that are determined by at least one terminal device; and
  obtaining the network status information and the historical throughput information.

For uplink transmission in the communication system, the network device may obtain the user buffer status information and the HARQ information that are determined by the at least one terminal device and obtain the network status information and the historical throughput information. That is, the system status information of the communication system is obtained. This lays a foundation for determining a reasonable scheduling policy.

In the foregoing possible implementations of the first aspect, the method further includes:
  sending the scheduling policy to the at least one terminal device.

The network device sends the determined scheduling policy to the at least one terminal device. In this way, the network device may communicate with the terminal device based on the same scheduling policy, thereby improving the system stability.

In still another possible implementation of the first aspect, the communication device is a terminal device, and before the communication device obtains the system status information, the method further includes:
  receiving neural network parameters broadcast by a network device; and
  determining the deep neural network based on the neural network parameters.

The deep neural network is trained on a network device side. In this way, the obtained scheduling policy is reasonable, and a capability requirement for the terminal device is reduced. The performance of the communication system is good.

In yet another possible implementation of the first aspect, the communication device is a terminal device, and that a communication device obtains system status information includes:
  receiving the network status information broadcast by a network device; and
  obtaining the user buffer status information, the HARQ information, and the historical throughput information.

The deep neural network is trained and used on a terminal device side, so that the scheduling policy that balances the throughput information and the fairness can be obtained, thereby improving the performance of the communication system.

In the foregoing possible implementations of the first aspect, the method further includes:
  sending the scheduling policy to the network device or another terminal device that communicates with the terminal device.

The terminal device sends the scheduling policy to the network device or the another terminal device that communicates with the terminal device (for a UCNC or D2D scenario), so that the network device or the another terminal device that communicates with the terminal device may communicate with the terminal device based on the received scheduling policy.

A second aspect provides a scheduling apparatus in a communication system. The scheduling apparatus is applicable to a communication device, and the apparatus includes an obtaining module, a processing module, and a transceiver module.

The obtaining module is configured to obtain system status information, where the system status information includes network status information.

The processing module is configured to obtain a scheduling policy based on the system status information and a deep neural network, where the deep neural network is obtained through training based on historical system status information, and the historical system status information includes system status information in all scheduling periods before a current scheduling period.

The transceiver module is configured to perform communication according to the scheduling policy.

For example, the system status information further includes historical throughput information and user buffer status information.

In a possible implementation of the second aspect, the processing module is configured to: determine estimated throughput information based on the network status information and the user buffer status information; input the estimated throughput information and the historical throughput information into the deep neural network to obtain a scheduling weight; and determine the scheduling policy based on the scheduling weight.

For example, the system status information further includes HARQ information.

The processing module is configured to determine the scheduling policy based on the scheduling weight and the HARQ information.

In the foregoing possible implementation of the second aspect, the processing module is configured to: determine estimated throughput information based on the network status information and the user buffer status information; input the estimated throughput information and the historical throughput information into the deep neural network to obtain the scheduling policy.

In another possible implementation of the second aspect, the processing module is configured to input the system status information into the deep neural network to obtain the scheduling policy.

In still another possible implementation of the second aspect, the processing module is configured to input the system status information into the deep neural network to obtain a scheduling weight; and obtain the scheduling policy based on the scheduling weight.

In any one of the foregoing possible implementations of the second aspect, the system status information input into the deep neural network further includes HARQ information.

In yet another possible implementation of the second aspect, the obtaining module is further configured to obtain current system throughput information, current fairness parameter information, and updated system status information that are obtained after the scheduling policy is executed.

The processing module is further configured to determine payoff information based on at least one of the following parameters: the current system throughput information, the current fairness parameter information, a system packet loss rate, and a system delay, where the payoff information is used to adjust a decision of the deep neural network in a next scheduling period.

In the foregoing possible implementations of the second aspect, the apparatus further includes a storage module.

The storage module is configured to store the system status information, the scheduling policy, the updated system status information, and the payoff information. The system status information, the scheduling policy, the updated system status information, and the payoff information are used to update the deep neural network.

In a possible implementation of the second aspect, the communication device is a network device. The obtaining module is configured to obtain the network status information and ACK/NACK information that are determined by at least one terminal device, update the HARQ information based on the ACK/NACK information, and obtain the user buffer status information and the historical throughput information.

In another possible implementation of the second aspect, the communication device is a network device. The obtaining module is configured to obtain the user buffer status information and the HARQ information that are determined by at least one terminal device, and obtain the network status information and the historical throughput information.

In the foregoing possible implementations of the second aspect, the transceiver module is further configured to send the scheduling policy to the at least one terminal device.

In still another possible implementation of the second aspect, the communication device is a terminal device. The transceiver module is further configured to: before the obtaining module obtains the system status information, receive neural network parameters broadcast by a network device.

The processing module is further configured to determine the deep neural network based on the neural network parameters.

In yet another possible implementation of the second aspect, the communication device is a terminal device. The obtaining module is configured to receive, by using the transceiver module, the network status information broadcast by a network device, and obtain the user buffer status information, the HARQ information, and the historical throughput information.

In the foregoing possible implementations of the second aspect, the transceiver module is further configured to send the scheduling policy to the network device or another terminal device that communicates with the terminal device.

For the second aspect and unexhausted beneficial effects of the possible implementations of the second aspect, refer to the descriptions in the first aspect. Details are not described herein again.

A third aspect provides a scheduling apparatus in a communication system, including a processor, a memory, and a computer program that is stored in the memory and can be run on the processor. When executing the program, the processor implements the method in the first aspect and the possible implementations of the first aspect.

A fourth aspect provides a chip for running instructions. The chip includes a memory and a processor; the memory stores code and data and is coupled to the processor; and the processor runs the code in the memory, to enable the chip to perform the method in the first aspect and the possible implementations of the first aspect.

A fifth aspect provides a storage medium. The storage medium stores instructions, and when the instructions are run on a computer, the computer is enabled to perform the method in the first aspect and the possible implementations of the first aspect.

A sixth aspect provides a program product including instructions. When the program product runs on a computer, the computer is enabled to perform the method in the first aspect and the possible implementations of the first aspect.

According to the scheduling method and apparatus in the communication system, and the storage medium that are provided in the embodiments, the communication device obtains the system status information, where the system status information includes the network status information; obtains the scheduling policy based on the system status information and the deep neural network; and performs the communication according to the scheduling policy. The deep neural network is obtained through training based on the historical system status information, and the historical system status information includes the system status information in all the scheduling periods before the current scheduling period. Therefore, the scheduling policy obtained based on the deep neural network can meet the balancing requirement of the throughput and the fairness and solves the problem of the low performance of the existing communication system.

DETAILED DESCRIPTION OF THE EMBODIMENTS

In the following, some terms in embodiments are described, to help a person of ordinary skill in the art have a better understanding.

Figure 1:
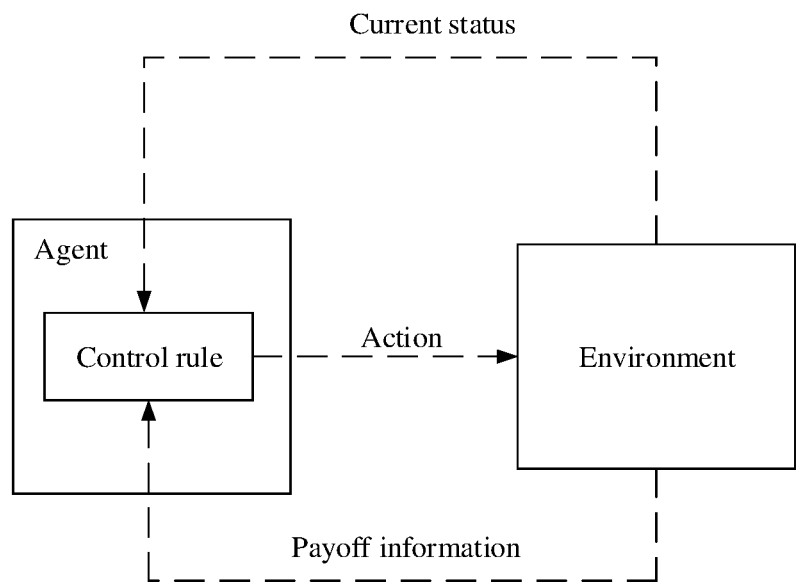
FIG. 1 is a schematic diagram of a principle of reinforcement learning.

Reinforcement Learning:

The reinforcement learning is an important machine learning method, and has a plurality of applications in fields such as an intelligent control robot and analysis and prediction. The reinforcement learning may regard learning as a heuristic evaluation process, and an agent of the reinforcement learning can obtain a maximum expected benefit and learn an optimal behavior by interacting with an environment. For example, FIG. 1 is a schematic diagram of a principle of the reinforcement learning. As shown in FIG. 1, the agent obtains a current status by observing the environment and decides an action for the environment according to a specific control rule (policy). After the environment receives and implements the action, the status changes. At the same time, one piece of payoff information (a reward or a penalty) is generated based on the status and fed back to the agent. The agent selects a next action based on the payoff information and the current status of the environment. A selection principle is to increase a probability of receiving a positive payoff (the reward) or decrease a probability of receiving a negative payoff (the penalty). Through a plurality of iterative learning, the agent learns to make an optimal decision based on the status of the environment.

Fully-Connected Neural Network:

The fully-connected neural network is also referred to as a multilayer perceptron (MLP). One MLP may include an input layer, an output layer, and a plurality of hidden layers located between the input layer and the output layer. Each layer (the input layer, the output layer, and the hidden layer) includes several nodes. The node is referred to as a neuron. Neurons of two adjacent layers are connected to each other.

Figure 2:
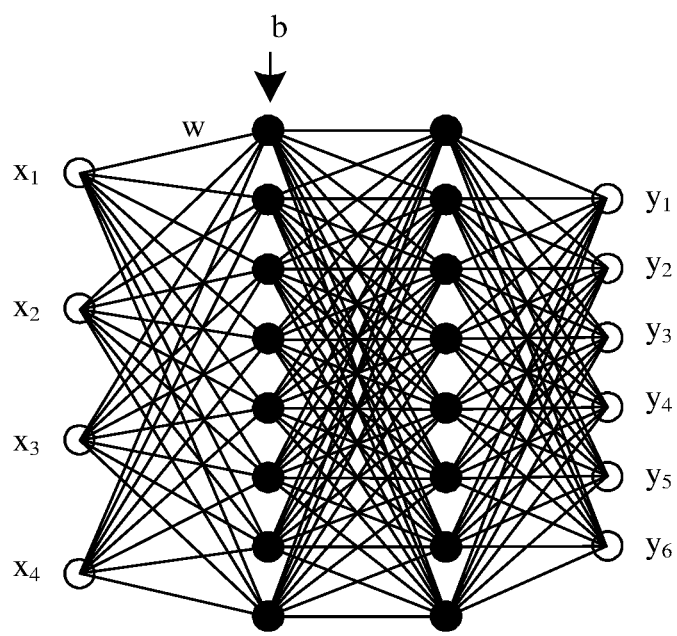
FIG. 2 is a schematic structural diagram of an MLP.

For example, FIG. 2 is a schematic structural diagram of the MLP. As shown in FIG. 2, for an MLP including one input layer, one output layer, and two hidden layers, if the input layer is represented by a vector x, and output of a hidden layer connected to the input layer is represented by a vector h, a relationship between the vector h and the vector x may be represented by using a matrix h=f(wx+b). For example, the vector h represents a result obtained after an activation function is performed on a weighted sum of the vector x of the input layer connected to the hidden layer, where w is a weight matrix, b is an offset vector, and f is the activation function. For the MLP shown in FIG. 2, $x=(x_1, \ldots, x_4)$ is a vector including all nodes included in the input layer, and $h=(h_1, \ldots, h_8)$ represents a vector including all nodes included in a first hidden layer.

Similarly, if the output layer is represented by a vector y, and it is assumed that output of a hidden layer connected to the output layer is represented by a vector $h=f_{n-1}(\ldots)$, the vector y of the output layer may be represented by using the following recursive expression: $y=f_n(w_n f_{n-1}(\ldots)+b_n)$, where is $w_n$ a weight matrix between the vector y and the output vector of the hidden layer $h=f_{n-1}(\ldots)$, $b_n$ is an offset vector between the vector y and the output vector of the hidden layer $h=f_{n-1}(\ldots)$, and $f_n()$ is an $n^{th}$ utilization activation function. For the MLP shown in FIG. 2, the output layer is represented by a vector $y=(y_1, \ldots, y_6)$.

Briefly, the neural network may be understood as a mapping relationship from an input data set to an output data set. Generally, the neural network is initialized at random. A process of obtaining the mapping relationship from the random weight matrix w and the offset vector b by using existing data is referred to as training of the neural network.

Figure 3:
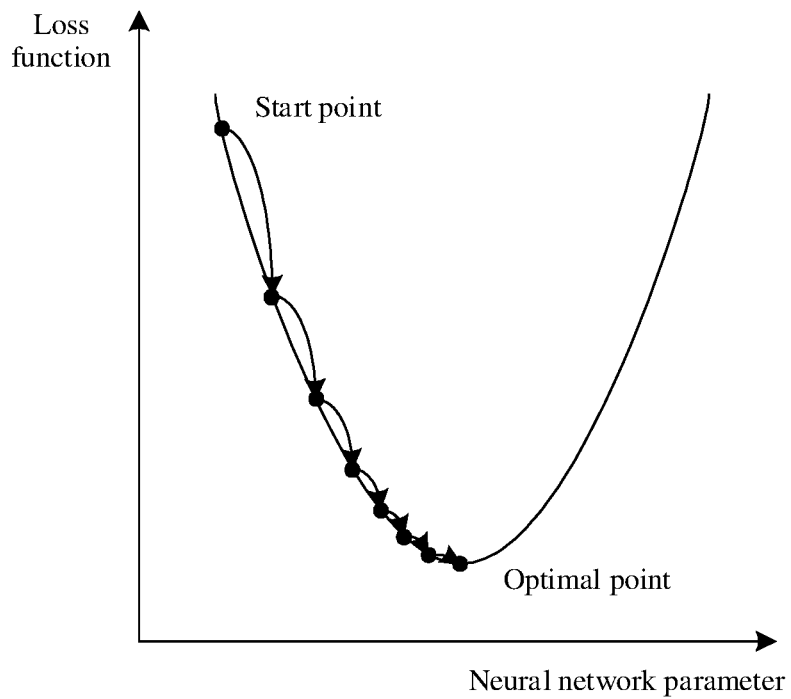
FIG. 3 is a schematic diagram of optimization of a loss function.

Optionally, a specific training manner of the neural network is to evaluate an output result of the neural network by using a loss function, backpropagate an error, and iteratively optimize the weight matrix w and the offset vector b by using a gradient descent method until the loss function reaches a minimum value. FIG. 3 is a schematic diagram of optimization of the loss function. As shown in FIG. 3, based on a relationship between the loss function and neural network parameters, the neural network parameters are gradually iterated, so that the loss function reaches the minimum value. For example, iteration starts from a start point until an optimal point is determined. It should be noted that the neural network parameters include the weight matrix w and the offset vector b.

Optionally, a gradient descent process may be represented as $$\theta \leftarrow \theta - \eta \frac{\partial L}{\partial \theta},$$

where $\theta$ is a to-be-optimized parameter (for example, w and b), L is the loss function, $\eta$ is a learning rate. The learning rate is used to control a gradient descent step.

Figure 4:
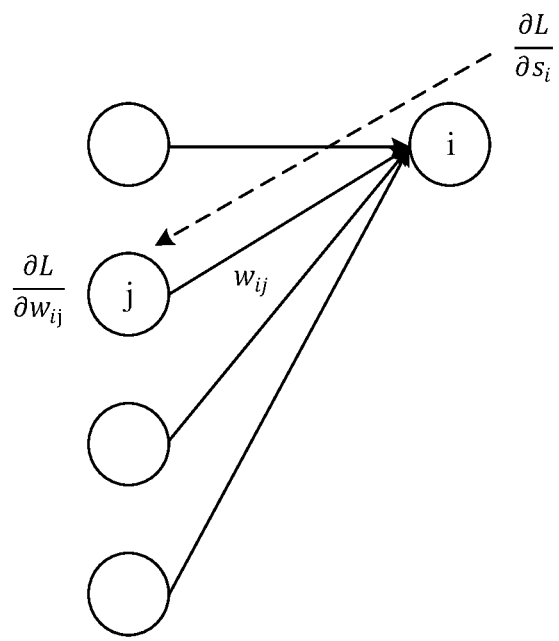
FIG. 4 is a schematic diagram of a node relationship during gradient backpropagation.

For example, a chain rule for obtaining a partial derivative is used in a backpropagation process, for example, a gradient of a parameter of a previous layer may be recursively calculated from a gradient of a parameter of a subsequent layer. Optionally, FIG. 4 is a schematic diagram of a node relationship during gradient backpropagation. As shown in FIG. 4, the chain rule for the backpropagation may be performed by using the following formula $$\frac{\partial L}{\partial w_{tj}} = \frac{\partial L}{\partial s_i} \frac{\partial s_i}{\partial w_{tj}},$$

where $w_{ij}$ is a weight located between a node j and to a node i, and $s_i$ is a weighted sum of input on a node i.

Figure 5:
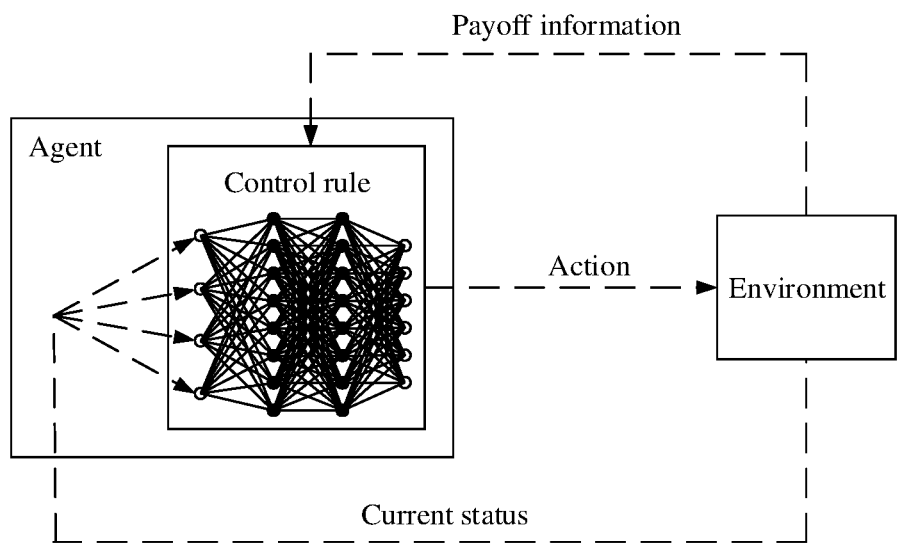
FIG. 5 is a schematic structural diagram of deep reinforcement learning.

Deep Reinforcement Learning:

The reinforcement learning and deep learning are combined to obtain the deep reinforcement learning (DRL). For example, FIG. 5 is a schematic structural diagram of the deep reinforcement learning. It can be learned by comparing FIG. 1 and FIG. 5 that the DRL still conforms to a framework of interaction between the agent and the environment in the reinforcement learning. A difference is that in the DRL, the agent use a deep neural network to make a decision.

The following first briefly describes an applicable scenario of the embodiments.

Figure 6:
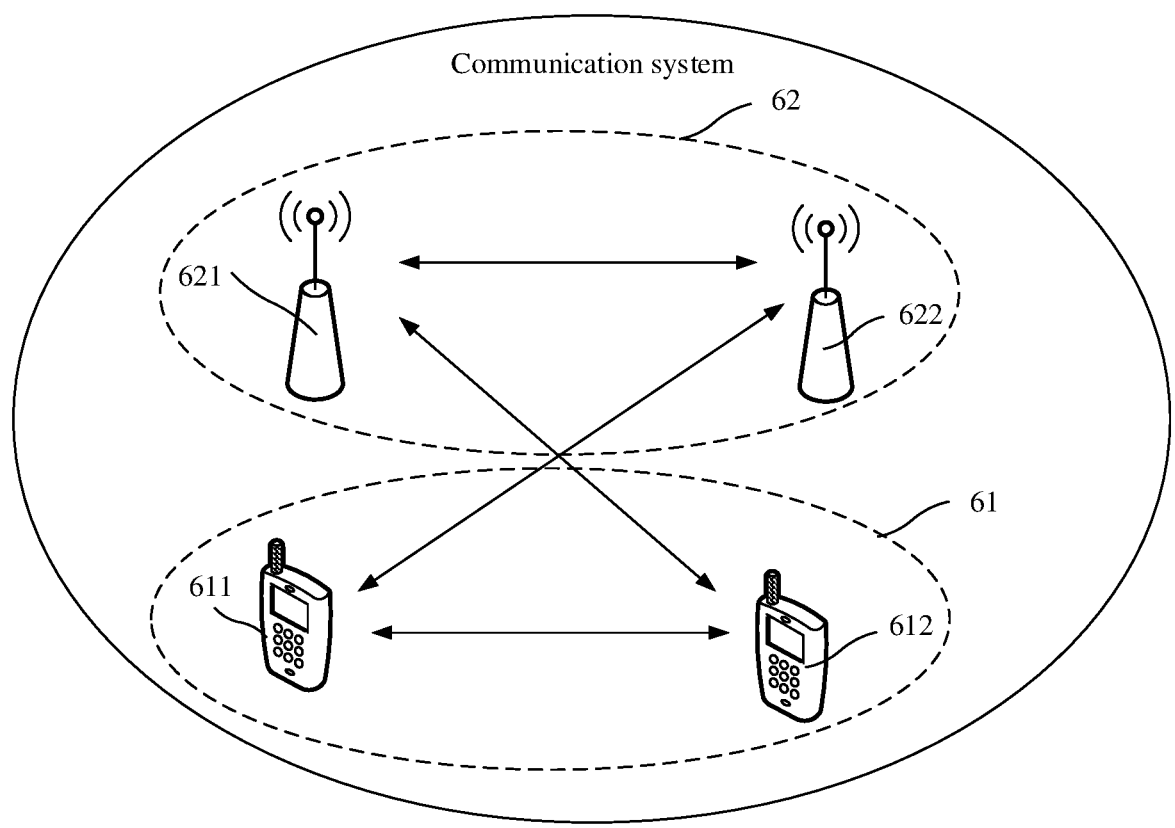
FIG. 6 is a schematic structural diagram of a communication system according to an embodiment.

A scheduling method in a communication system provided in the following embodiments may be applied to the communication system. FIG. 6 is a schematic structural diagram of a communication system according to an embodiment. As shown in FIG. 6, the communication system may include at least one terminal device 61 and at least one network device 62. FIG. 6 shows two terminal devices (a terminal device 611 and a terminal device 612) and two network devices (a network device 621 and a network device 622) as an example. A quantity of terminal devices and a quantity of network devices are not limited in this embodiment, and may be determined based on an actual situation.

For example, in the communication system shown in FIG. 6, any terminal device in the at least one terminal device 61 may communicate with any network device in the at least one network device 62, and any two terminal devices or any two network devices may separately communicate with each other. In this way, information is transmitted or synchronized.

Optionally, the communication system is not limited to the network device and the terminal device, and may further include another network entity, for example, a network controller or a mobility management entity. This embodiment is not limited thereto provided that an entity for sending information and an entity for receiving information exist in the communication system.

The communication system used in this embodiment may be a global system for mobile communication (GSM), a code division multiple access (CDMA) system, a wideband code division multiple access (WCDMA) system, a long term evolution (LTE) system, an LTE frequency division duplex (FDD) system, an LTE time division duplex (TDD) system, a universal mobile telecommunication system (UMTS), and another wireless communication system that uses an orthogonal frequency division multiplexing (OFDM) technology. A system architecture and a service scenario described in the embodiments are intended to describe solutions in the embodiments more clearly, and do not constitute a limitation on the solutions provided in the embodiments. A person of ordinary skill in the art may know that with evolution of the network architecture and emergence of a new service scenario, the solutions provided in the embodiments are also applicable to a similar problem.

In this embodiment, the network device may be configured to provide a wireless communication function for the terminal device, so that the terminal device accesses the communication system in a wireless manner. The network device may include various forms of macro base stations, micro base stations (also referred to as small cells), relay stations, access points, and the like. The network device may be a base transceiver station (BTS) in the CDMA system, a NodeB (NB) in the WCDMA system, or an evolved NodeB (eNB or e-NodeB) in the LTE system; or may be a corresponding device gNB in a 5G network, a base station in a future communication system, an access node in a Wi-Fi system, or the like. A specific technology and a specific device form used by the network device are not limited in this embodiment. For ease of description, in all of the embodiments, all of the foregoing apparatuses that provide the wireless communication function for the terminal device are referred to as the network device.

For example, the terminal device in the embodiments may include various handheld devices, vehicle-mounted devices, wearable devices, or computing devices that have the wireless communication function, or other processing devices connected to a wireless modem. Optionally, the terminal device may be also referred to as user equipment (UE), a mobile station (MS), a mobile terminal (MT), a terminal, or the like. The terminal device may communicate with one or more core networks by using a radio access network (RAN). For example, the terminal device may be a mobile phone (also referred to as a cellular phone), a computer with a mobile terminal, or the like. For example, the terminal device may be a portable, pocket-sized, handheld, computer built-in, or in-vehicle mobile apparatus, which exchanges voice and/or data with the radio access network. The terminal device may alternatively be a mobile phone, a subscriber unit, a smartphone, a wireless data card, a personal digital assistant (PDA) computer, a tablet computer, a wireless modem, a handheld device, a laptop computer, a machine type communication (MTC) terminal, or the like. A specific technology and a specific device form used for the terminal device are not limited in the embodiments.

Optionally, the network device and the terminal device may be deployed on land, including an indoor or outdoor device, a handheld device, or a vehicle-mounted device; may be deployed on a water surface; or may be deployed on an aircraft, a balloon, or an artificial satellite in the air. Application scenarios of the network device and the terminal device are not limited in the embodiments.

In this embodiment, it can be understood from content recorded in the background that, in a MAC layer-based scheduling method, the communication system is mainly used as a determined model, and a scheduling solution is derived by using a formula. For example, resource block group (RBG) allocation in a cellular network is used as an example for description below.

At present, relatively commonly used scheduling algorithms include a round robin (RR) algorithm, a maximum carrier-to-interference power ratio (Maximum C/I) algorithm, and a proportional fair (PF) algorithm. A scheduling policy corresponding to the RR algorithm is that users alternately use a shared resource. Because an instantaneous channel condition is not considered in a scheduling process of the RR algorithm, performance of the entire communication system is relatively low. A scheduling policy corresponding to the maximum C/I algorithm is that a user with a best channel quality is selected for scheduling. This ensures that system throughput reaches a maximum value. However, fairness is not considered in the scheduling policy. The PF algorithm can implement a better tradeoff between throughput and fairness, and is widely used. The following briefly describes a problem of an existing scheduling method by using the PF algorithm as an example.

For example, the PF algorithm selects a scheduled user based on a model $$k = \arg\max_{i} \frac{R_i(t)}{T_i(t)},$$

where $R_i(t)$ is estimated throughput of a user i at a moment t, and is determined by factors such as channel condition information and user buffer status information. $T_i(t)$ is historical accumulated throughput of the user i at the moment t. It can be understood that, $$\frac{R_i(t)}{T_i(t)}$$

is a measurement of balancing both the throughput and the fairness. If the current estimated throughput $R_i(t)$ is larger, it indicates a better channel condition of the user. In addition, sufficient data in buffer needs to be sent. Therefore, a measurement value is also larger. In addition, if the historical accumulated throughput $T_i(t)$ is larger, it indicates a larger amount of data that has been sent by the user. To ensure the fairness, data to be sent needs to be reduced. Therefore, the measurement value is also smaller. The tradeoff between the throughput and the fairness is implemented by selecting a user with a largest measurement value for scheduling.

However, the communication system is relatively complex, and the scheduling solution obtained based on the foregoing algorithm cannot meet the balancing requirement between the throughput and the fairness, and the performance of the communication system is low.

To resolve the foregoing problems, an embodiment provides a scheduling method in the communication system. A communication device obtains system status information, obtains a scheduling policy based on the system status information and a deep neural network, and finally performs communication according to the scheduling policy. In this method, the deep neural network is obtained through training based on historical system status information, and the historical system status information includes system status information in all scheduling periods before a current scheduling period. Therefore, the scheduling policy obtained based on the method can meet a balancing requirement of throughput and the fairness and improve performance of the communication system.

For example, an applicable scenario of this embodiment is the communication system, an execution agent is the communication device running the deep neural network, and resource scheduling in the communication system is implemented in a deep reinforcement learning manner.

In the embodiments, "a plurality of" refers to two or more than two. The term "and/or" describes an association relationship for describing associated objects and represents that three relationships may exist. For example, A and/or B may represent the following three cases: only A exists, both A and B exist, and only B exists. The character "/" generally indicates an "or" relationship between the associated objects.

Specific embodiments are used below to describe in detail the solutions. It should be noted that the following several specific embodiments may be combined with each other, and a same or similar concept or process may not be described repeatedly in some embodiments.

Figure 7A:
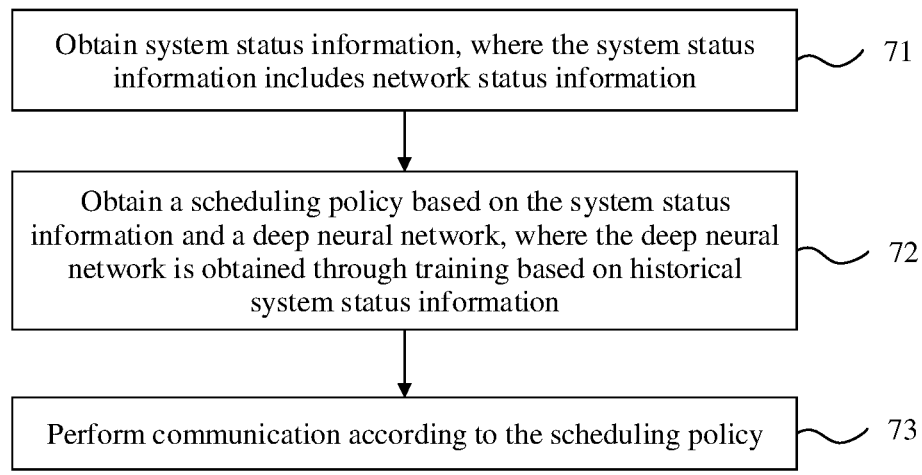
FIG. 7A is a schematic flowchart of Embodiment 1 of a scheduling method in a communication system according to an embodiment.

FIG. 7A is a schematic flowchart of Embodiment 1 of a scheduling method in a communication system according to an embodiment. The method is applicable to a communication device in the communication system. As shown in FIG. 7A, the method may include the following steps:

Step 71: Obtain system status information, where the system status information includes network status information.

For example, in this embodiment, before the communication device communicates with another device in the communication system, a scheduling policy may be first determined between the communication device and the another device in the communication system. To determine the scheduling policy, the system status information of the communication system in which the communication device is located first needs to be obtained, for example, related information that reflects network quality such as the network status information.

For example, in this embodiment, the scheduling policy may include a communication resource allocation solution, power control, MCS selection, user pairing, and precoding matrix calculation. In the communication system, a communication resource may refer to resources such as time domain, frequency domain, space domain, code domain, or a polarization manner. Therefore, the communication resource allocation solution may refer to a resource allocation manner of at least one of the resources such as the time domain, the frequency domain, the space domain, the code domain, or the polarization manner.

Optionally, the network status information may include one or more of the following parameters: channel coefficient information, channel signal to noise ratio (SNR) information, system bandwidth information, user location information, network load information, and the like. It should be noted that, the network status information in this embodiment includes, but is not limited to, including the foregoing parameters, and may be determined based on an actual scenario. Details are not described herein again.

Optionally, different scheduling policies correspond to different specific implementation solutions. Therefore, different system parameters may be selected for the different scheduling policies to represent the system status information. Therefore, the system status information includes, but is not limited to, the foregoing network status information. In another scenario, the system status information may further include other information such as user buffer status information and historical throughput information. Details are not described herein again.

For example, in an actual application, the communication device may obtain the system status information by using a plurality of different modules or may need to interact with another device to obtain the system status information. A manner of obtaining the system status information may be determined based on an actual situation. Details are not described herein again.

Step 72: Obtain the scheduling policy based on the system status information and a deep neural network, where the deep neural network is obtained through training based on historical system status information.

The historical system status information includes system status information in all scheduling periods before a current scheduling period.

In this embodiment, the deep neural network obtained through training may run on the communication device, and the deep neural network may be obtained through training by the communication device based on the historical system status information, or may be obtained through training by the another device that can communicate with the communication device. However, neural network parameters of the deep neural network are synchronized to the communication device. A specific obtaining form of the deep neural network is not limited in this embodiment, and may be determined based on an actual situation.

The deep neural network in this embodiment is an open model and may be obtained based on a deep reinforcement learning method by using the system status information in all the scheduling periods before the current scheduling period. In addition, after the scheduling period ends, system status information involved in this scheduling may also be used as input of the deep neural network, to update the deep neural network. In other words, the deep neural network is a result of continuous iterative update based on the system status information in all the scheduling periods before the current scheduling period.

In this embodiment, after obtaining the current system status information, the communication device may obtain the scheduling policy based on the system status information and the deep neural network. Optionally, the communication device may first obtain a scheduling weight based on the system status information, and then obtain the scheduling policy; or may directly obtain the scheduling policy. A specific implementation of obtaining the scheduling policy is not limited in this embodiment, and may be determined based on an actual requirement.

Optionally, the scheduling weight refers to a scheduling weight of each to-be-scheduled user. The scheduling weight is similar to a weight calculated in the foregoing proportional fairness solution and is used to indicate a scheduling priority of each to-be-scheduled user. Without loss of generality, a user with a highest scheduling weight has a highest scheduling priority. The scheduling policy may refer to the foregoing communication resource allocation solution, power control, MCS selection, user pairing, precoding matrix calculation, and the like.

For a specific implementation principle and beneficial effects of this step, refer to descriptions in the following Embodiment 2 to Embodiment 5. Details are not described herein.

Figure 7B:
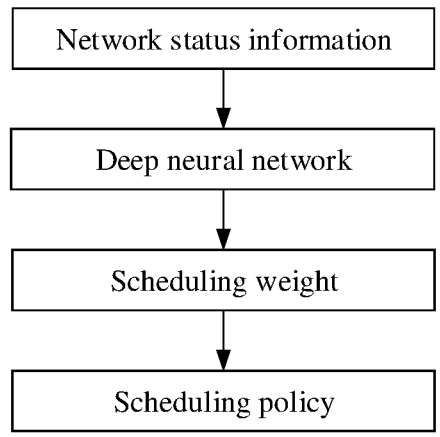
FIG. 7B is a schematic diagram of a first possible implementation of obtaining a scheduling policy based on system status information and a deep neural network.
Figure 7C:
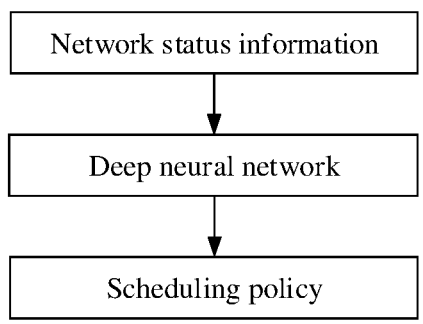
FIG. 7C is a schematic diagram of a second possible implementation of obtaining a scheduling policy based on system status information and a deep neural network.

For example, FIG. 7B is a schematic diagram of a first possible implementation of obtaining the scheduling policy based on the system status information and the deep neural network. FIG. 7C is a schematic diagram of a second possible implementation of obtaining the scheduling policy based on the system status information and the deep neural network. As shown in FIG. 7B and FIG. 7C, in the two implementations, the network status information is used as input of the deep neural network. A difference between the two implementations is that, in the implementation shown in FIG. 7B, output of the deep neural network is the scheduling weight; and in the implementation shown in FIG. 7C, output of the deep neural network is the scheduling policy directly, namely, a final scheduling policy, for example, results of the communication resource allocation solution, the MCS selection, and the precoding matrix calculation. Compared with the implementation shown in FIG. 7C, the implementation shown in FIG. 7B requires fewer resources and relatively low hardware consumption and has a higher processing speed. However, network performance of the implementation shown in FIG. 7B is not as good as that of the implementation shown in FIG. 7C.

Optionally, the communication resource allocation solution may be a resource block group (RBG) and/or a spatial flow allocation solution.

Optionally, in the implementation shown in FIG. 7B, the scheduling weight obtained by the communication device is the scheduling weight of each to-be-scheduled user. Therefore, the communication device may determine the scheduling policy based on the scheduling weight. In other words, the communication resource solution, the MCS selection, the precoding matrix, and the like that can be used by each to-be-scheduled user are determined. A specific determining process is the same as an existing communication system solution. Details are not described herein again.

It should be noted that, in the implementation shown in FIG. 7B, because the user with the highest scheduling weight has the highest scheduling priority, the communication device schedules the user with the highest "scheduling weight" in this scheduling period. It should be noted that at least one user is finally scheduled to perform data transmission in each scheduling period. When a quantity of scheduled users is n, and n is greater than 1, n users with highest scheduling weights are selected.

Step 73: Perform communication according to the scheduling policy.

In this embodiment, after determining the scheduling policy, the communication device may communicate with the another device in the communication system according to the scheduling policy. The communication device may first synchronize the scheduling policy to the another device that communicates with the communication device, and then perform information transmission based on the results of the communication resource allocation solution, the MCS selection, the precoding matrix calculation, and the like that correspond to the scheduling policy. A specific communication implementation process of the communication device is not limited in this embodiment, and may be determined based on an actual situation.

According to the scheduling method in the communication system provided in this embodiment, the communication device obtains the system status information, where the system status information includes the network status information; then obtains the scheduling policy based on the system status information and the deep neural network; and performs communication according to the scheduling policy. The deep neural network is obtained through training based on the historical system status information, and the historical system status information includes the system status information in all the scheduling periods before the current scheduling period. Therefore, the scheduling policy obtained based on the deep neural network can meet a balancing requirement of throughput and fairness. Performance of the communication system is good.

For example, in a possible implementation of this embodiment, the system status information further includes the historical throughput information and the user buffer status information.

Optionally, in this embodiment, the historical throughput information may indicate user throughput information of the communication system before the current period, and the historical throughput information may be used to evaluate the fairness. The user buffer status information may be used to calculate estimated throughput information of the current period. Therefore, in this embodiment, the system status information used to determine the scheduling policy may further include the historical throughput information and the user buffer status information.

Similarly, the historical system status information used to train the deep neural network may further include the historical throughput information, the user buffer status information, and the like.

Optionally, in an actual application, if the foregoing step of obtaining the system status information is performed by a status obtaining module in the communication device, the status obtaining module may further include a plurality of submodules such as a network status obtaining submodule, a buffer status obtaining submodule, and a historical parameter obtaining submodule.

Optionally, the status obtaining module may further need to exchange information with another module of the communication device or another device or apparatus other than the communication device. For example, the network status obtaining submodule may need to perform signaling interaction with a peer end of a communication link, so as to implement measurement on a network or a channel and further obtain the network status information. If the communication device is a receiving device, the communication device may need to interact with a sending device through the communication link to obtain a reported user buffer status information. The status obtaining module may also need to store the obtained system status information into a cache module or the like.

Figure 8A:
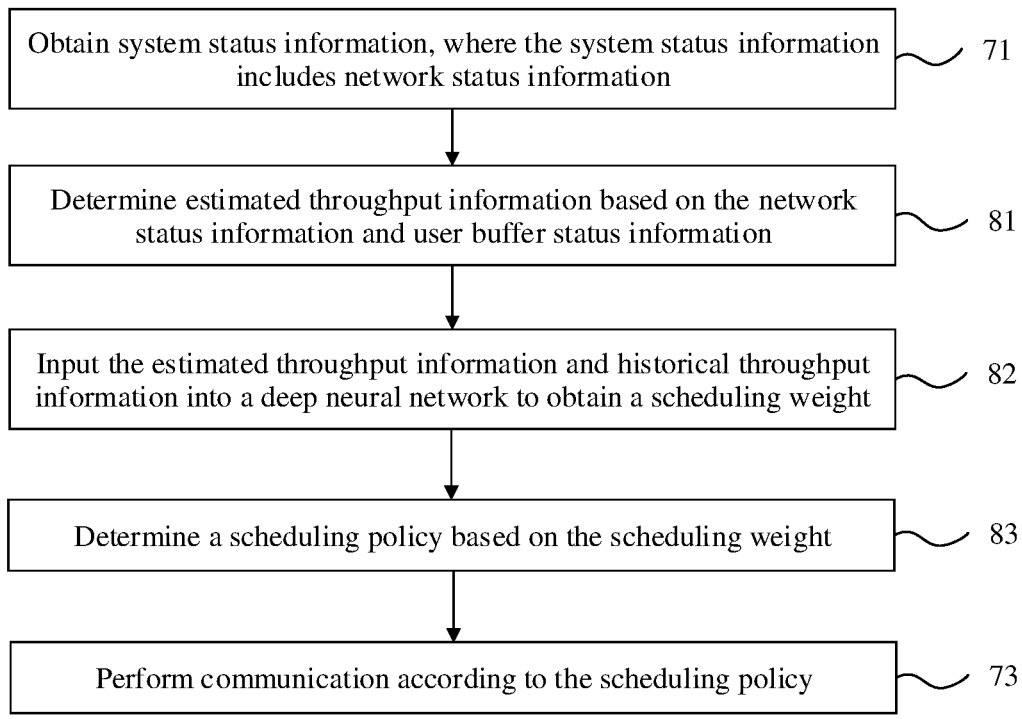
FIG. 8A is a schematic flowchart of Embodiment 2 of a scheduling method in a communication system according to an embodiment.
Figure 8B:
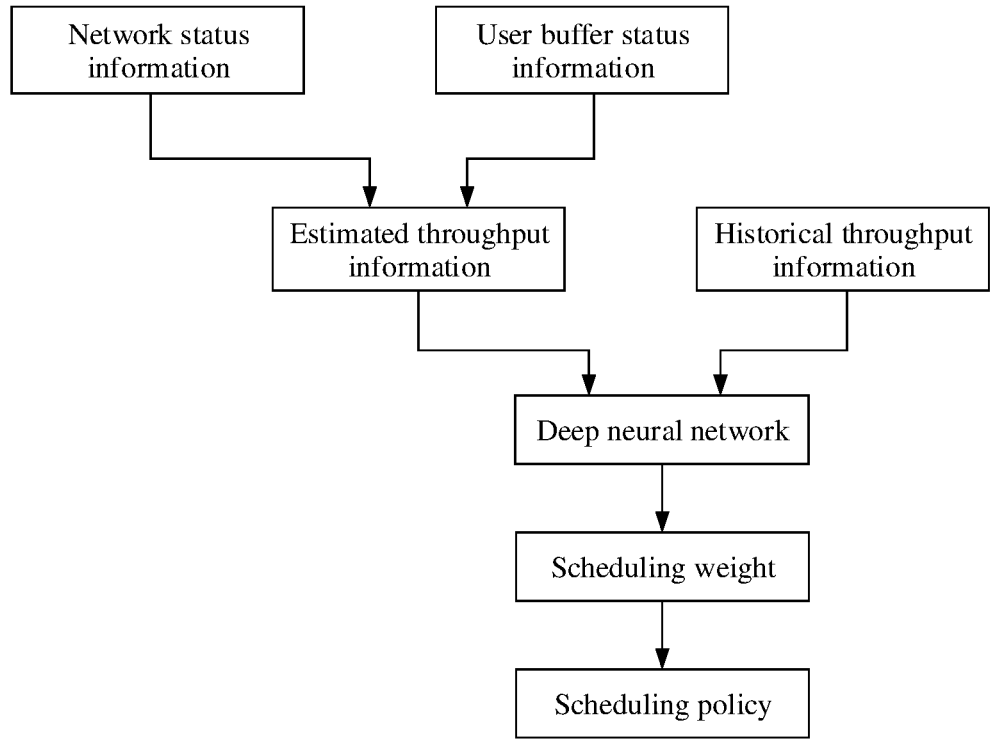
FIG. 8B is a schematic diagram of a third possible implementation of obtaining a scheduling policy based on system status information and a deep neural network.

For example, based on the foregoing embodiment, FIG. 8A is a schematic flowchart of Embodiment 2 of the scheduling method in the communication system according to an embodiment. For example, FIG. 8B is a schematic diagram of a third possible implementation of obtaining the scheduling policy based on the system status information and the deep neural network. As shown in FIG. 8A, in this embodiment, step 72 may be implemented by using the following steps:

Step 81: Determine the estimated throughput information based on the network status information and the user buffer status information.

Optionally, in this embodiment, after obtaining the network status information, the historical throughput information, and the user buffer status information that are of a current system, as shown in FIG. 8B, the communication device may first calculate the estimated throughput information by using the network status information and the user buffer status information. In this way, channel quality of each user and data in buffer are determined, and then the scheduling policy is determined.

Step 82: Input the estimated throughput information and the historical throughput information into the deep neural network to obtain the scheduling weight.

As an example, as shown in FIG. 8B, in this embodiment, the communication device may use the estimated throughput information and the historical throughput information that are obtained through calculation as the input of the deep neural network, and the output of the deep neural network is the scheduling weight. Implementation of the scheduling weight is consistent with the implementation shown in FIG. 7B. For descriptions of the scheduling weight, refer to the description in the foregoing embodiment. Details are not described herein again.

Step 83: Determine the scheduling policy based on the scheduling weight.

In this embodiment, as shown in FIG. 8B, after obtaining the scheduling weight, the communication device may determine the scheduling policy based on the scheduling weight, that is, calculate solutions such as the communication resource allocation solution, the MCS selection, and the precoding matrix that can be used by each scheduled user. A specific determining process is the same as the existing communication system solution. Details are not described herein again.

According to the scheduling method in the communication system provided in this embodiment, the communication device determines the estimated throughput information based on the network status information and the user buffer status information, inputs the estimated throughput information and the historical throughput information into the deep neural network to obtain the scheduling weight, and finally determines the scheduling policy based on the scheduling weight. In this solution, the communication device first calculates the estimated throughput information, and then inputs the estimated throughput information and the historical throughput information into the deep neural network to obtain the scheduling weight, and finally obtains the scheduling policy. This reduces processing pressure of the system and improves system stability.

It should be noted that, in the foregoing embodiments, when determining the scheduling policy, the communication device does not consider impact of hybrid automatic repeat request (HARQ) information on a scheduling process. This is because in some communication systems (such as an ultra-high reliability low latency communication (URLLC) system, and a satellite communication system), an HARQ function may not exist or be disabled. In this case, the impact of the HARQ information on the scheduling policy does not need to be considered.

Optionally, the HARQ information may include at least HARQ process status information and HARQ buffer status information. The HARQ process status information may be understood as storing only information such as a process number retransmitted by each user, and the HARQ buffer status information may indicate information such as an amount of retransmitted data and a remaining time before expiration. Therefore, generally, in a transmission network in which data transmission is a main task, the retransmitted data usually has a higher priority than newly transmitted data.

Generally, when the HARQ function exists and is enabled in the communication system, the HARQ information may be considered in the solution of determining the scheduling policy.

For example, in a possible implementation of this embodiment, the system status information further includes the HARQ information.

Figure 8C:
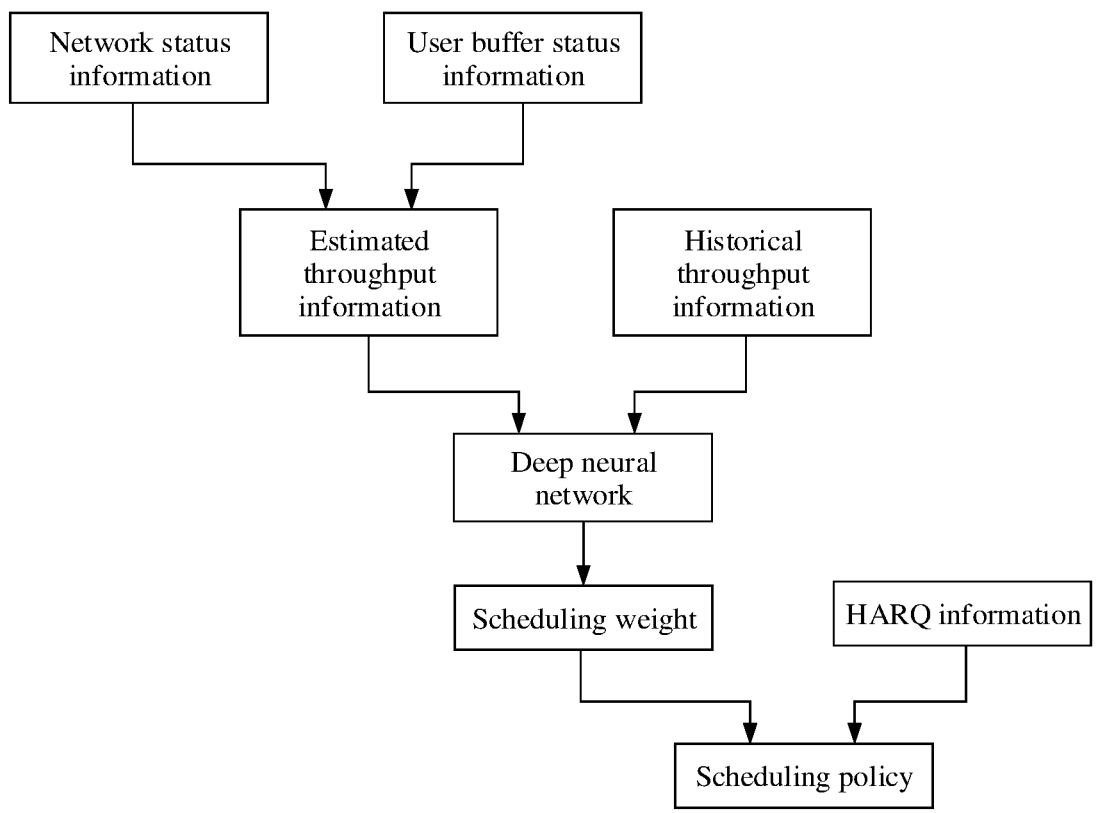
FIG. 8C is a schematic diagram of a fourth possible implementation of obtaining a scheduling policy based on system status information and a deep neural network.

For example, FIG. 8C is a schematic diagram of a fourth possible implementation of obtaining the scheduling policy based on the system status information and the deep neural network. As shown in FIG. 8C, the HARQ information and the scheduling weight output by the deep neural network may determine the scheduling policy together. Therefore, in this possible implementation, step 83 may be implemented by using the following step:

determining the scheduling policy based on the scheduling weight and the HARQ information.

Optionally, in this embodiment, after the scheduling weight of each user is determined by using the deep neural network, the scheduling priorities of all to-be-scheduled users are adjusted by considering the HARQ information, so that transmission of retransmission information about to expire may be preferably ensured. That is, a higher scheduling priority is given to a user having this type of information. Therefore, the scheduling policy determined based on the scheduling weight and the HARQ information can implement scheduling fairness.

This solution has a relatively low requirement for the deep neural network, and pressure of the deep neural network is relatively low.

Figure 8D:
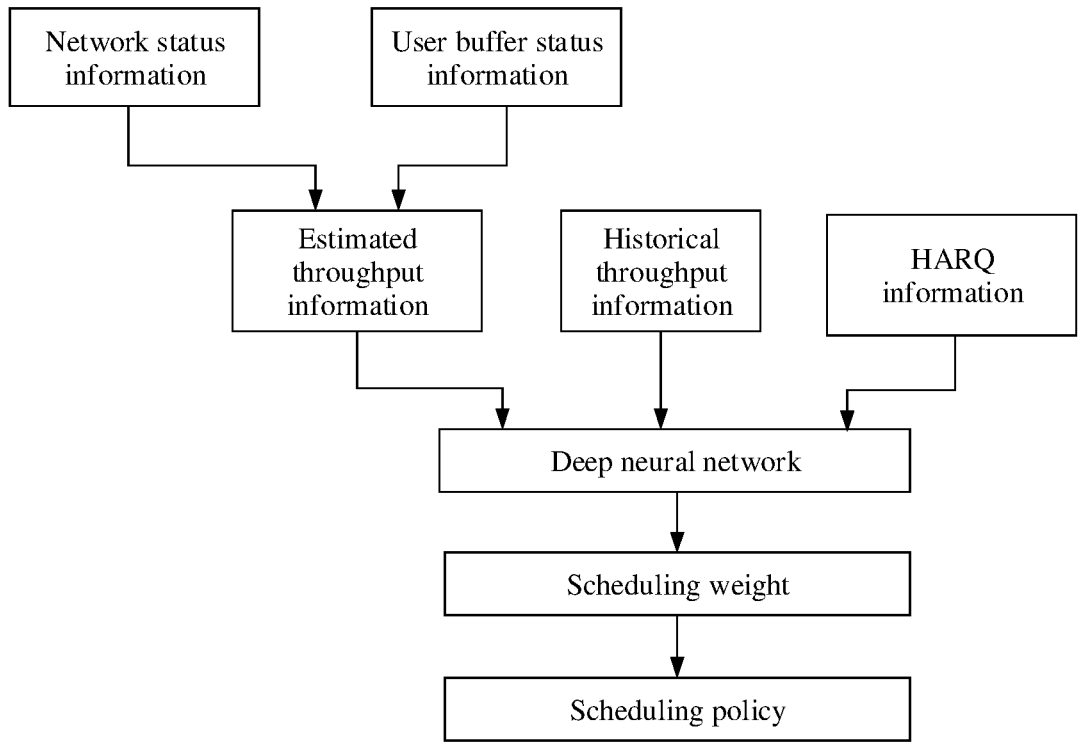
FIG. 8D is a schematic diagram of a fifth possible implementation of obtaining a scheduling policy based on system status information and a deep neural network.

For example, FIG. 8D is a schematic diagram of a fifth possible implementation of obtaining the scheduling policy based on the system status information and the deep neural network. As shown in FIG. 8D, the system status information input into the deep neural network further includes the HARQ information. Correspondingly, the step 82 may be implemented by performing the following step:

inputting the estimated throughput information, the historical throughput information, and the HARQ information into the deep neural network to obtain the scheduling weight.

Optionally, a difference between this step and step 82 lies in that, in this embodiment, the system status information input into the deep neural network further includes the HARQ information. For example, as shown in FIG. 8D, the communication device may use the estimated throughput information determined based on the network status information and the user buffer status information, the historical throughput information, and the HARQ information as the input of the deep neural network. In this way, when determining the scheduling weight, the deep neural network not only considers the channel quality and the data in buffer, but also considers the scheduling priority of the user having the HARQ information. In this way, the obtained scheduling weight is more reasonable, a tradeoff between user throughput and the fairness is fully considered, and the communication system stability is further improved.

Figure 9A:
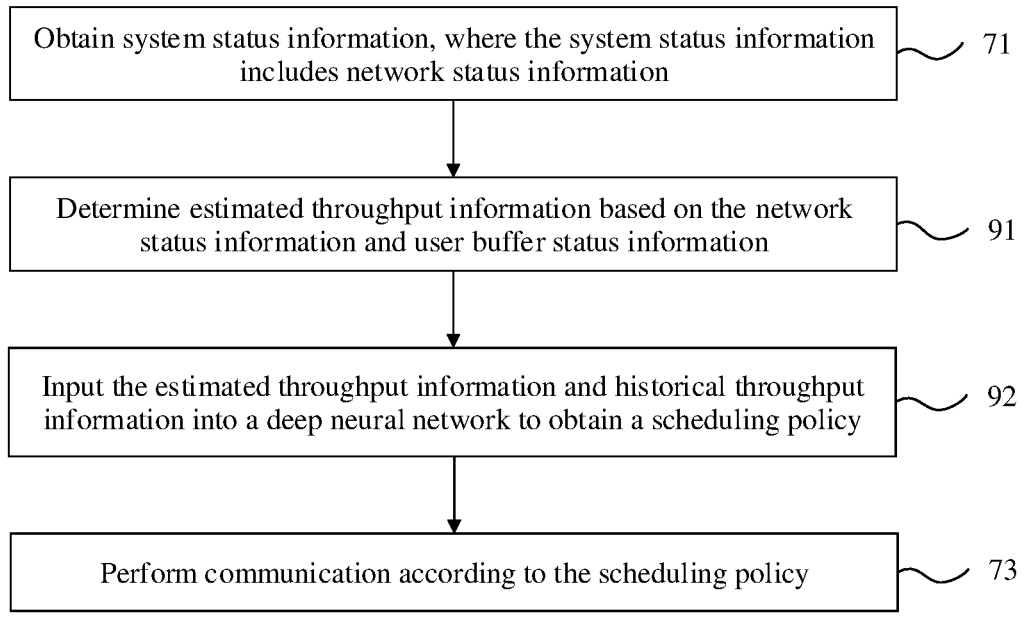
FIG. 9A is a schematic flowchart of Embodiment 3 of a scheduling method in a communication system according to an embodiment.
Figure 9B:
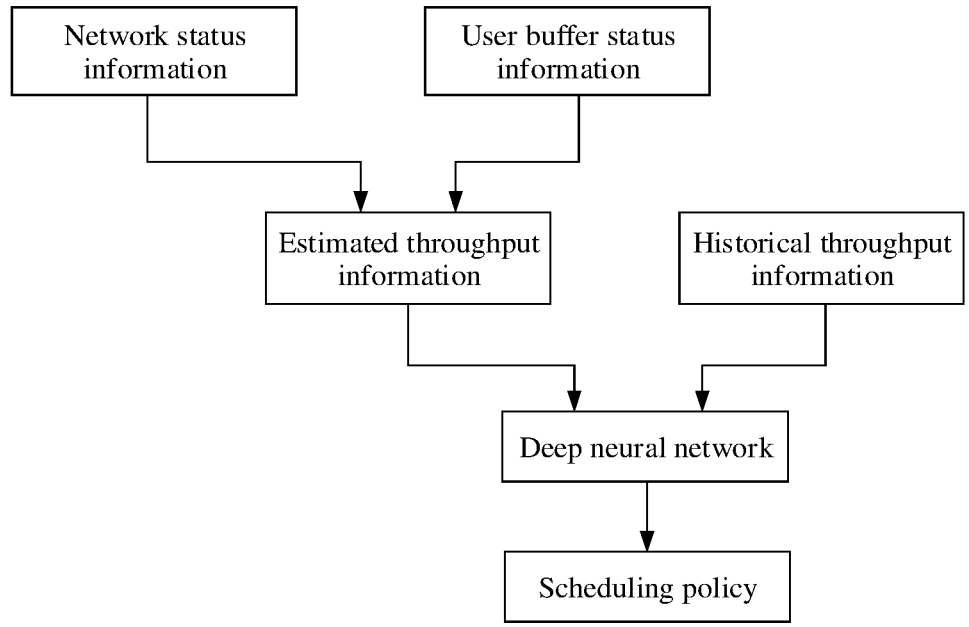
FIG. 9B is a schematic diagram of a sixth possible implementation of obtaining a scheduling policy based on system status information and a deep neural network.

For example, based on the foregoing embodiments, FIG. 9A is a schematic flowchart of Embodiment 3 of the scheduling method in the communication system according to an embodiment. For example, FIG. 9B is a schematic diagram of a sixth possible implementation of obtaining the scheduling policy based on the system status information and the deep neural network. As shown in FIG. 9A, in this embodiment, step 72 may be implemented by using the following steps:

Step 91: Determine the estimated throughput information based on the network status information and the user buffer status information.

In this embodiment, as shown in FIG. 9B, the communication device first obtains the estimated throughput information by using the network status information and the user buffer status information.

An implementation of step 91 is the same as an implementation of step 81 in the embodiment shown in FIG. 8A. For details, refer to the descriptions in step 81. Details are not described herein again.

Step 92: Input the estimated throughput information and the historical throughput information into the deep neural network to obtain the scheduling policy.

As an example, as shown in FIG. 9B, in this embodiment, the communication device may use the estimated throughput information obtained through calculation and the historical throughput information in the system status information as the input of the deep neural network, and the deep neural network may directly output the scheduling policy, that is, a scheduling result determined by the deep neural network is the communication resource allocation solution, the MCS index, and/or the precoding matrix.

In this embodiment, the input of the deep neural network is the estimated throughput information and the historical throughput information, and the output the deep neural network is the scheduling policy. In this way, the system performance of the communication device having the deep neural network is relatively good.

For example, in another possible implementation of this embodiment, when the communication device considers the impact of the HARQ information on the scheduling process, the system status information input into the deep neural network further includes the HARQ information.

Correspondingly, the step 92 may be implemented by performing the following step:
  inputting the estimated throughput information, the historical throughput information, and the HARQ information into the deep neural network to obtain the scheduling policy.

Figure 9C:
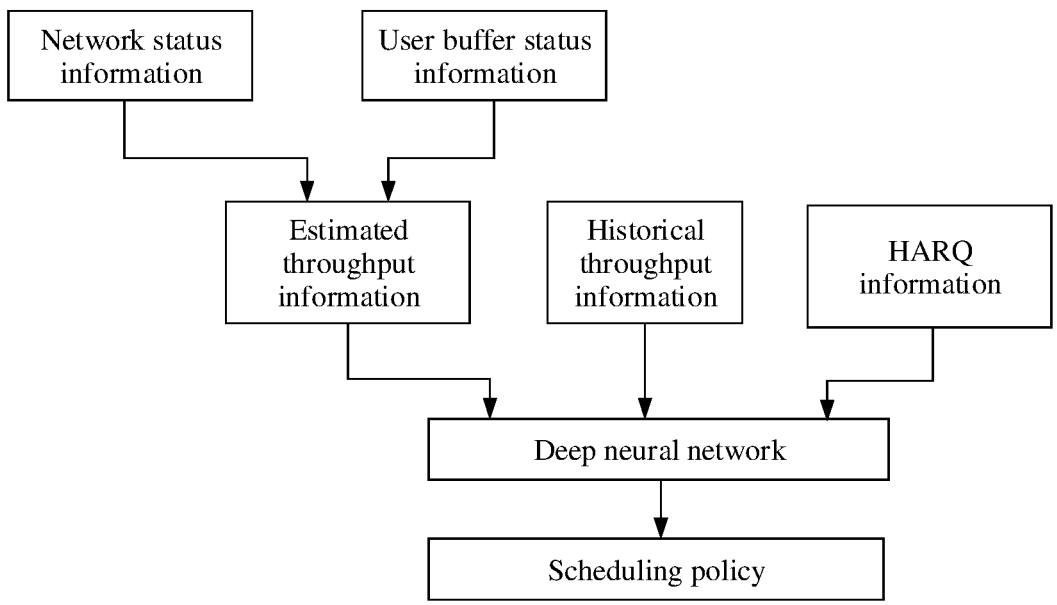
FIG. 9C is a schematic diagram of a seventh possible implementation of obtaining a scheduling policy based on system status information and a deep neural network.

For example, FIG. 9C is a schematic diagram of a seventh possible implementation of obtaining the scheduling policy based on the system status information and the deep neural network. Optionally, as shown in FIG. 9C, the HARQ information is input into the deep neural network as a part of the system status information, and the deep neural network directly outputs the scheduling policy.

Optionally, in this embodiment, the input of the deep neural network includes the historical throughput information, the estimated throughput information obtained through calculation based on the network status information and the user buffer status information, and the obtained HARQ information; and the scheduling decision result corresponding to the scheduling policy is: the communication resource allocation solution, the MCS index, and/or the precoding matrix.

Figure 10A:
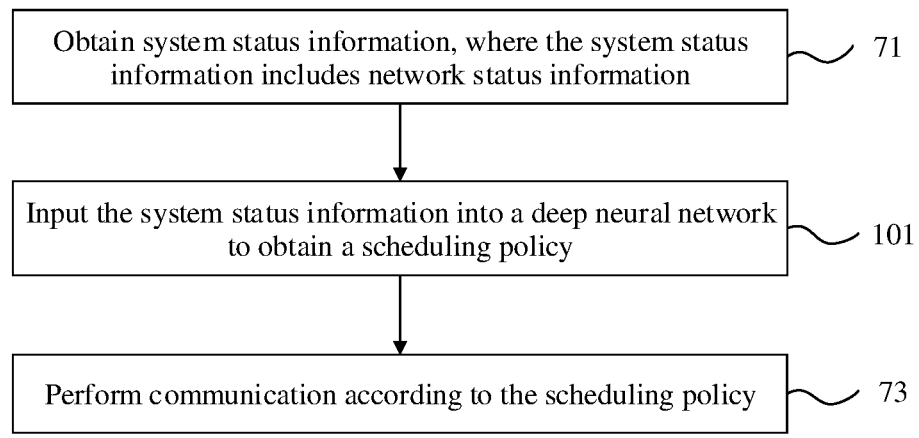
FIG. 10A is a schematic flowchart of Embodiment 4 of a scheduling method in a communication system according to an embodiment.
Figure 10B:
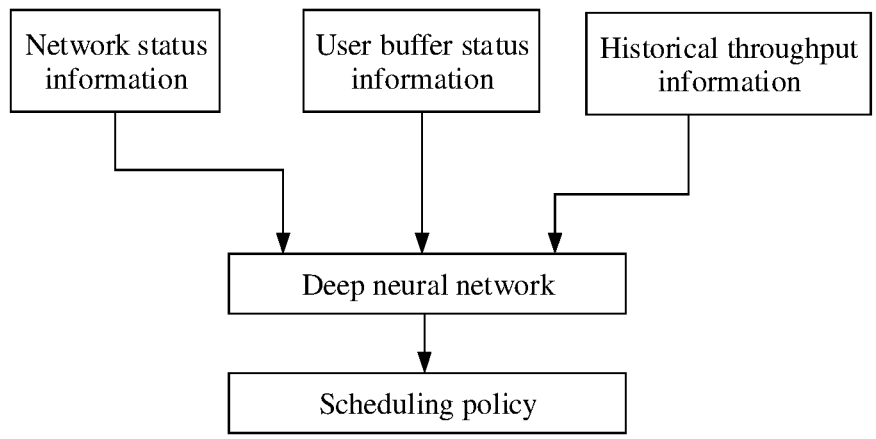
FIG. 10B is a schematic diagram of an eighth possible implementation of obtaining a scheduling policy based on system status information and a deep neural network.

For example, based on the foregoing embodiments, FIG. 10A is a schematic flowchart of Embodiment 4 of the scheduling method in the communication system according to an embodiment. For example, FIG. 10B is a schematic diagram of an eighth possible implementation of obtaining the scheduling policy based on the system status information and the deep neural network. As shown in FIG. 10A, in this embodiment, step 72 may be implemented by using the following step:

Step 101: Input the system status information into the deep neural network to obtain the scheduling policy.

As shown in FIG. 10B, in this embodiment, the system status information includes the network status information, the historical throughput information, and the user buffer status information. Therefore, in this implementation, the communication device may directly input the network status information, the historical throughput information, and the user buffer status information that are included in the system status information into the deep neural network, to obtain the scheduling policy.

In this embodiment, the obtained system status information is all input into the deep neural network. This reduces complexity of the communication system and improves the performance of the communication system. However, this solution has a relatively high requirement for the deep neural network, consumes a relatively large quantity of resources, and has a relatively slow processing speed.

Further, on the basis of this embodiment, when the communication device considers the impact of the HARQ information on the scheduling process, similarly, the system status information input into the deep neural network further includes the HARQ information.

Correspondingly, the step 101 may be implemented by performing the following step:
  inputting the network status information, the historical throughput information, the user buffer status information, and the HARQ information into the deep neural network to obtain the scheduling policy.

Figure 10C:
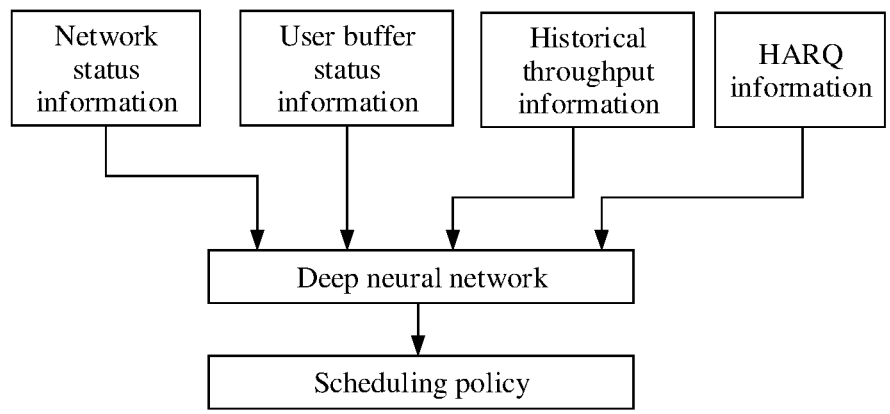
FIG. 10C is a schematic diagram of a ninth possible implementation of obtaining a scheduling policy based on system status information and a deep neural network.

For example, FIG. 10C is a schematic diagram of a ninth possible implementation of obtaining the scheduling policy based on the system status information and the deep neural network. As shown in FIG. 10C, in this embodiment, the communication device may use the historical throughput information, the network status information, the user buffer status information, and the HARQ information included in the system status information as the input of the deep neural network, and the output of the deep neural network is the scheduling policy.

A difference between the implementation shown in FIG. 10C and the implementation shown in FIG. 10B lies only in that, in this implementation, the system status information input into the deep neural network further includes the HARQ information indicating whether the system status information is the retransmission information, so that an output result of the deep neural network is more reasonable. The performance of the communication system is further improved.

Figure 11A:
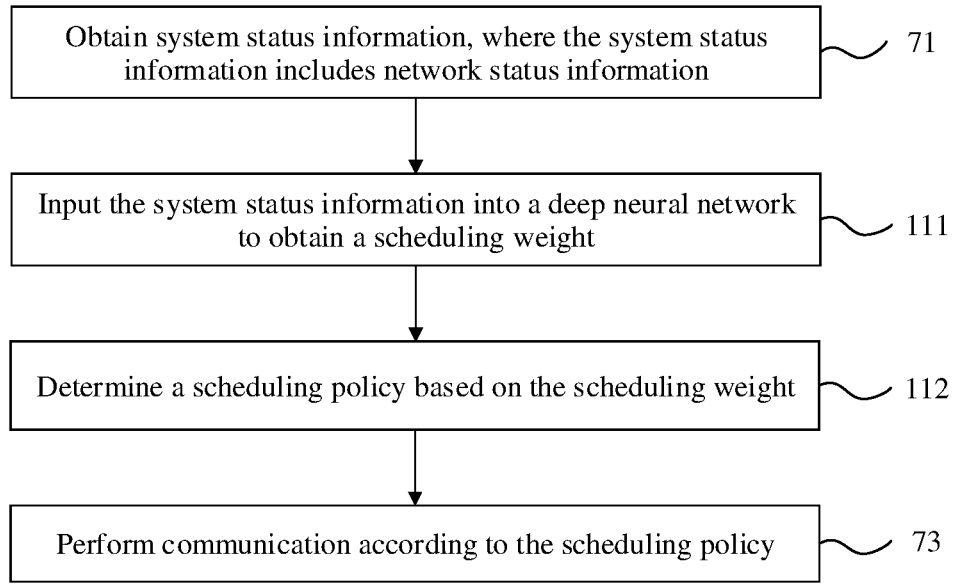
FIG. 11A is a schematic flowchart of Embodiment 5 of a scheduling method in a communication system according to an embodiment.
Figure 11B:
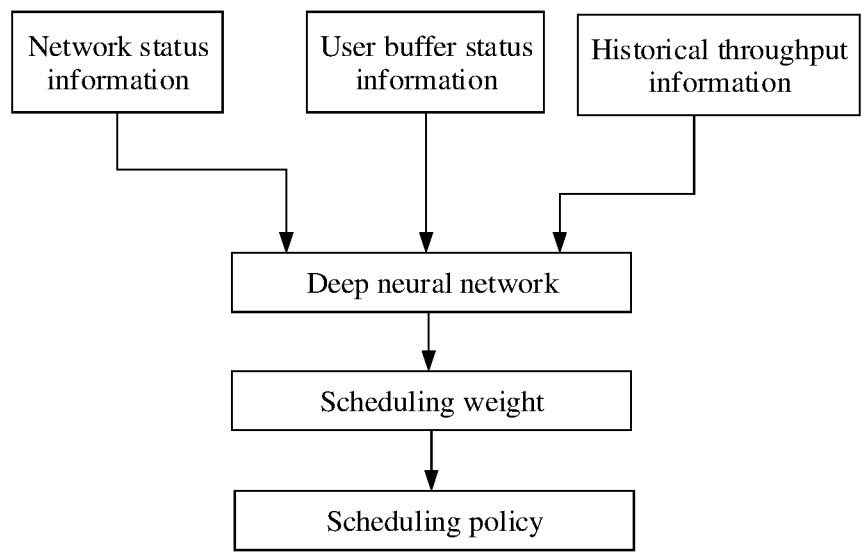
FIG. 11B is a schematic diagram of a tenth possible implementation of obtaining a scheduling policy based on system status information and a deep neural network.

For example, based on the foregoing embodiments, FIG. 11A is a schematic flowchart of Embodiment 5 of the scheduling method in the communication system according to an embodiment. FIG. 11B is a schematic diagram of a tenth possible implementation of obtaining the scheduling policy based on the system status information and the deep neural network. As shown in FIG. 11A, in this embodiment, step 72 may be implemented by using the following steps:

Step 111: Input the system status information into the deep neural network to obtain the scheduling weight.

Optionally, in this embodiment, as shown in FIG. 11B, the communication device may input the network status information, the historical throughput information, and the user buffer status information that are included in the system status information into the deep neural network. In this case, the output of the deep neural network may be the scheduling weight, namely, the scheduling weight used to indicate the scheduling priority of each to-be-scheduled user.

Step 112: Determine the scheduling policy based on the scheduling weight.

An implementation principle of step 112 is similar to that of step 83 in the embodiment shown in FIG. 8A. For details, refer to the descriptions in the foregoing embodiments. Details are not described herein again.

A difference between the implementation shown in FIG. 11B and the implementation shown in FIG. 10B lies only in that, in this implementation, the output of the deep neural network is the scheduling weight; and in the implementation shown in FIG. 10B, the output of the deep neural network is the scheduling policy.

In this embodiment, the scheduling weight is first obtained based on the system status information, and then the scheduling policy is determined based on the scheduling weight. In this way, the pressure of the deep neural network can be reduced, the performance of the communication system can be improved, and the tradeoff between the user throughput and the fairness is implemented.

Further, on the basis of this embodiment, when the communication device considers the impact of the HARQ information on the scheduling process, similarly, the system status information input into the deep neural network further includes the HARQ information.

Correspondingly, the step 111 may be implemented by performing the following step:

inputting the network status information, the historical throughput information, the user buffer status information, and the HARQ information into the deep neural network to obtain the scheduling value.

Figure 11C:
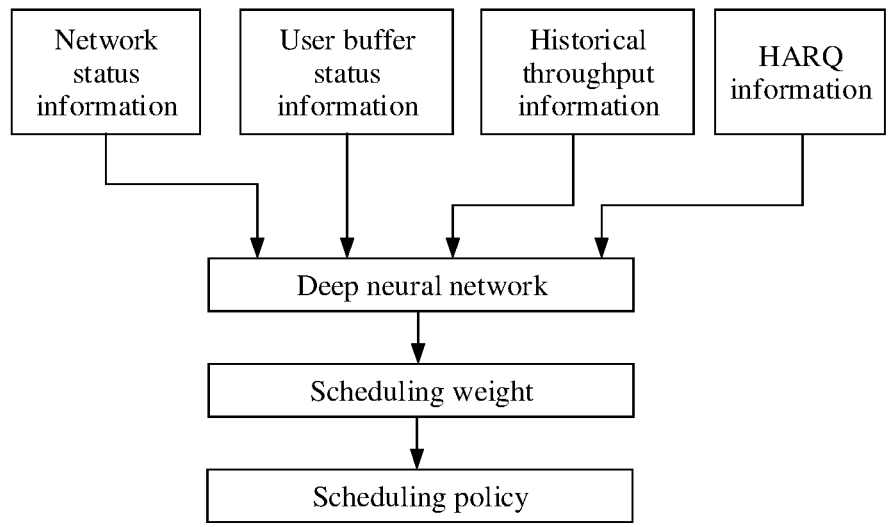
FIG. 11C is a schematic diagram of an eleventh possible implementation of obtaining a scheduling policy based on system status information and a deep neural network.

For example, FIG. 11C is a schematic diagram of an eleventh possible implementation of obtaining the scheduling policy based on the system status information and the deep neural network. As shown in FIG. 11C, in this embodiment, the communication device may use the historical throughput information, the network status information, the user buffer status information, and the HARQ information that are included in the system status information as the input of the deep neural network, and the output of the deep neural network is the scheduling weight.

A difference between the implementation shown in FIG. 11C and the implementation shown in FIG. 11B lies only in that, in this implementation, the system status information input into the deep neural network further includes the HARQ information indicating whether the system status information is the retransmission information, so that the scheduling weight output by the deep neural network is more reasonable. The performance of the communication system is further improved.

Figure 12:
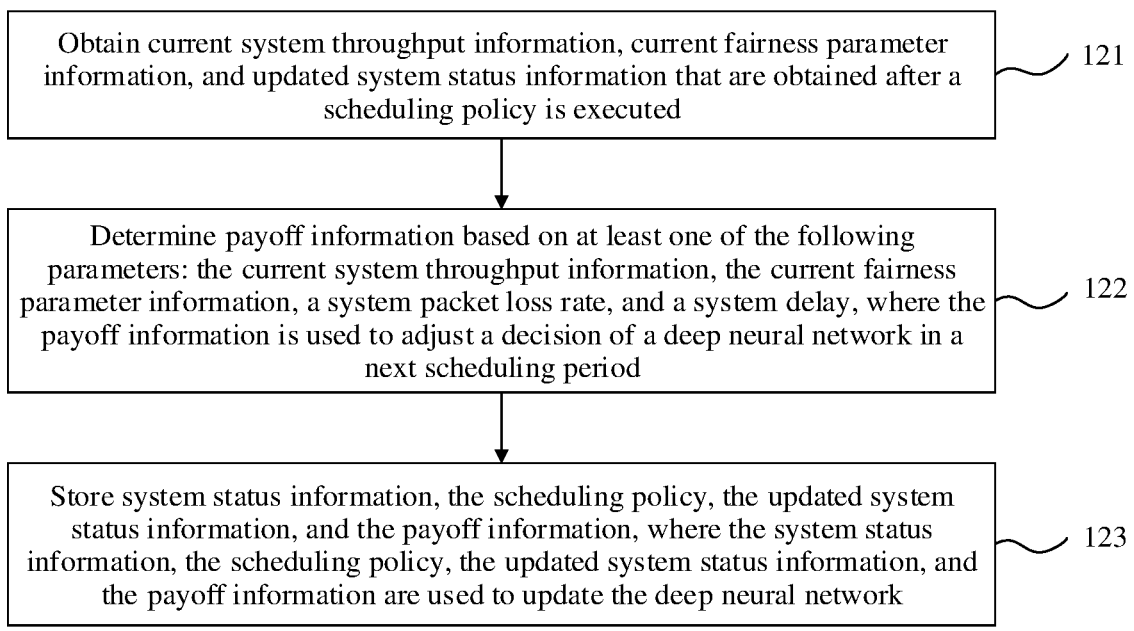
FIG. 12 is a schematic flowchart of Embodiment 6 of a scheduling method in a communication system according to an embodiment.

For example, based on any one of the foregoing embodiments, FIG. 12 is a schematic flowchart of Embodiment 6 of the scheduling method in the communication system according to an embodiment. As shown in FIG. 12, the method may further include the following steps:

Step 121: Obtain current system throughput information, current fairness parameter information, and updated system status information that are obtained after the scheduling policy is executed.

Optionally, in this embodiment, after the communication device performs the communication for a period of time based on the determined scheduling policy, the system status information of the communication system changes correspondingly, for example, the network status information, the user buffer status information, the HARQ information, historical parameters, and the like may all change. In this case, the communication device may obtain the current system throughput information, the current fairness parameter information, and the updated system status information that are of the communication system by detecting or interacting with the another device.

Step 122: Determine payoff information based on at least one of the following parameters: the current system throughput information, the current fairness parameter information, a system packet loss rate, and a system delay, where the payoff information is used to adjust a decision of the deep neural network in a next scheduling period.

Optionally, in this embodiment, the communication device may calculate, based on a given payoff function, the payoff information obtained after the scheduling policy is executed, to adjust the decision of the deep neural network in the next scheduling period.

For example, in this embodiment, the payoff information may be determined based on system performance parameters of the communication system. The system performance parameters include, but are not limited to, the system throughput information and the fairness parameter information. Some other system performance parameters such as the system packet loss rate, a transmission delay, and the like in a communication process are classified into parameters for determining the payoff information, and the fairness parameter information may include content such as a ratio between different service flows.

For example, in this embodiment, the system status information used by the deep neural network in deep reinforcement learning includes the estimated throughput information and the historical throughput information. The estimated throughput information is estimated throughput information of each to-be-scheduled user on each RBG at a current moment. For a scenario in which m+1 user equipment (UE 1 to UE m) and n+1 RBGs (RBG 0 to RBG n), a data structure of the estimated throughput information may be as follows:

|  | UE 0 | UE 1 | ... | UE m |
|---|---|---|---|---|
| RBG 0 | $inst\_THP_{00}$ | $inst\_THP_{01}$ | ... | $inst\_THP_{0m}$ |
| RBG 1 | $inst\_THP_{10}$ | $inst\_THP_{11}$ | ... | $inst\_THP_{1m}$ |
| ... | ... | ... | ... | ... |
| RBG n | $inst\_THP_{n0}$ | $inst\_THP_{n1}$ | ... | $inst\_THP_{nm}$ |

In this embodiment, the historical throughput information is historical throughput information of each to-be-scheduled user. For the m+1 user equipment (the UE 1 to the UE m), a data structure of the historical throughput information may be as follows:

| UE 0 | UE 1 | ... | UE m |
|---|---|---|---|
| $THP_0$ | $THP_1$ | ... | THP m |

Optionally, in this embodiment, when the output result of the deep neural network in the deep reinforcement learning is the scheduling weight of each to-be-scheduled user on each RBG, a data structure of the scheduling weight may be as follows:

|  | UE 0 | UE 1 | ... | UE m |
|---|---|---|---|---|
| RBG 0 | Scheduling weight$_{00}$ | Scheduling weight$_{01}$ | ... | Scheduling weight$_{0m}$ |
| RBG 1 | Scheduling weight$_{10}$ | Scheduling weight$_{11}$ | ... | Scheduling weight$_{1m}$ |
| ... | ... | ... | ... | ... |
| RBG n | Scheduling weight$_{n0}$ | Scheduling weight$_{n1}$ | ... | Scheduling weight$_{nm}$ |

For example, in this embodiment, the following describes a relationship between the payoff information, the current system throughput information, and the current fairness parameter information.

As an example, the payoff information Reward=inst_THP+eta×fairness. For example, the payoff information is equal to a weighted sum of the current system throughput information and the current fairness parameter information.

Reward represents the payoff information obtained after the scheduling policy is executed, inst_THP is the current system throughput information, fairness is the current fairness parameter information, and eta may be a preset real number. A value of eta may be adjusted, to adjust a proportion of the current system throughput information and the current fairness information in the payoff information.

Optionally, the current fairness parameter information may generally be represented by using a widely used Jain formula:

$$J = \frac{(\sum_{i=1}^{n} x_i)^2}{n \sum_{i=1}^{n} x_i^2}$$

n indicates a total quantity of to-be-scheduled users, and $x_i$ indicates current system throughput information of a user i.

As another example, the payoff information Reward=inst_THP+eta×fairFlag. Similarly, the payoff information is equal to a weighted sum of the current system throughput information inst_THP and the current fairness parameter information fairFlag.

A value of eta is also used to adjust a proportion of the current system throughput information and the current fairness parameter information in the payoff information.

In an actual application, the scheduling result of the current scheduling period is compared with that of a previous scheduling period, and if a user in the current scheduling period different from that of the previous scheduling period is scheduled, fairFlag=1. Otherwise, fairFlag=is 0. In this manner, a user in each scheduling period different from that in a previous scheduling period is encouraged to be scheduled, to implement the fairness.

It should be noted that calculation of the payoff information is used to indicate whether the output result of the deep neural network is good or bad. A proper calculation formula of the payoff information is set, to enable the deep neural network to make a better decision more quickly.

Optionally, the payoff information is generally calculated based on the system performance parameters. For example, in this implementation, the payoff information is calculated based on the current system throughput information and the current fairness parameter information. In another scenario, other system performance parameters of the communication system may also be considered for the calculation of the payoff information, for example, content such as the system packet loss rate, the transmission delay, and fairness between various services.

Optionally, in this embodiment, as shown in FIG. 12, the method may further include the following steps:

Step 123: Store the system status information, the scheduling policy, the updated system status information, and the payoff information, where the system status information, the scheduling policy, the updated system status information, and the payoff information are used to update the deep neural network.

For example, before the deep neural network is used, the deep neural network may first be obtained through training based on the historical system status information. In each training period of the deep neural network, a start point may be first set. The start point may be used to represent a start location or a moment of the communication device in each training period. For example, if one day is used as the training period, a fixed time point in each day may be used as the start point of the training period, and a training process is to be re-executed each time the starting point reaches.

Optionally, the communication device may use the obtained system status information, the obtained scheduling policy, the updated system status information, and the corresponding payoff information as an experience for storage, and further train or update the deep neural network by using the experience.

It should be noted that update of the deep neural network may be a gradual process. After each scheduling period is completed, only some parameters of the deep neural network may be updated each time, and the update of the entire deep neural network may be completed after a plurality of scheduling periods.

Optionally, after each scheduling period is completed, the deep neural network may be updated by using the obtained system status information, the scheduling policy, the updated system status information, and the payoff information. In addition, an updated deep neural network plays a role in a process of determining the scheduling policy in the next scheduling period.

According to the scheduling method in the communication system provided in this embodiment, the communication device may further obtain the current system throughput information, the current fairness parameter information, and the updated system status information that are obtained after the scheduling policy is executed; determine the payoff information based on the at least one of the following parameters: the current system throughput information, the current fairness parameter information, the system packet loss rate, the system delay, where the payoff information is used to adjust the decision of the deep neural network in the next scheduling period; and store the system status information, the scheduling policy, the updated system status information, and the payoff information, where the system status information, the scheduling policy, the updated system status information, and the payoff information are used to update the deep neural network. In this solution, one piece of payoff information is determined for subsequent update of the deep neural network, so that reasonableness of the scheduling policy in a subsequent scheduling period can be improved.

Optionally, in this embodiment, as an example, the communication device is a network device, for example, the deep neural network may run in the network device, or be integrated into a scheduler, and the scheduler is integrated into the network device.

For an existing cellular wireless network, for example, an LTE network, a centralized scheduling manner is usually used in this type of network, and the network device in the communication system performs resource scheduling. When the communication device is the network device, for downlink transmission between the network device and a terminal device, the scheduling method in the communication system may be implemented by using an embodiment shown in FIG. 13.

Figure 13:
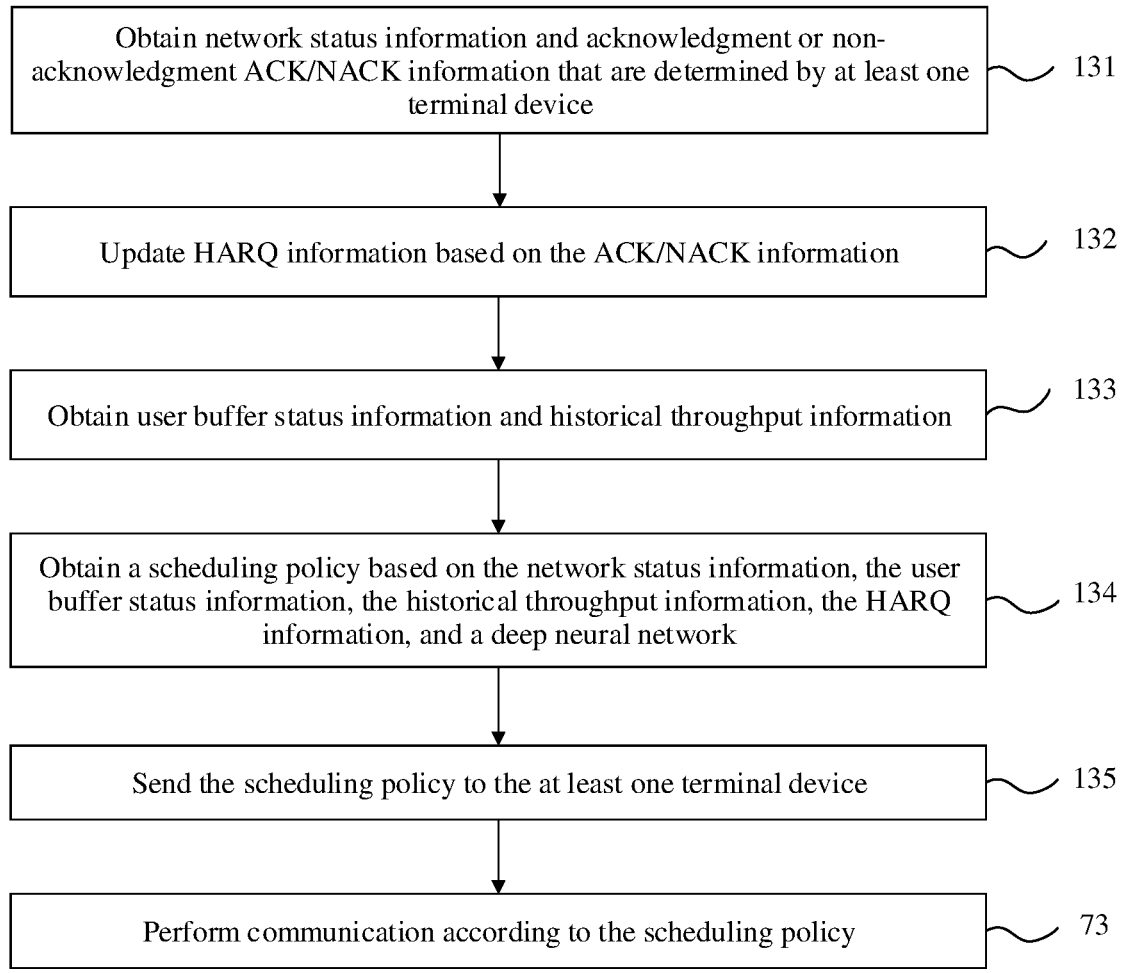
FIG. 13 is a schematic flowchart of Embodiment 7 of a scheduling method in a communication system according to an embodiment.

For example, FIG. 13 is a schematic flowchart of Embodiment 7 of the scheduling method in the communication system according to an embodiment. As shown in FIG. 13, step 71 may be implemented by using the following steps:

Step 131: Obtain the network status information and ACK/NACK information that are determined by at least one terminal device.

Optionally, in a downlink transmission process of the communication system, each terminal device may measure the network status information, such as a current channel status, and determine the ACK or NACK information used for communicating with the network device.

As an example, the at least one terminal device may directly feed back the network status information and the ACK/NACK information to the network device, so that the network device directly receives the network status information and the ACK/NACK information that are determined and sent by the at least one terminal device.

As another example, after the terminal device reports the determined network status information and the ACK/NACK information to a network device in the communication system, the network device may synchronize the received network status information and the received ACK/NACK information to the another network device in the communication system. Therefore, the network device may obtain the network status information and the ACK/NACK information of the at least one terminal device from the another network device.

Step 132: Update the HARQ information based on the ACK/NACK information.

Optionally, in this embodiment, after obtaining the ACK/NACK information of the at least one terminal device, the network device may determine, based on the ACK/NACK information, whether data transmission between the terminal device and the network device is successful; determine whether retransmission is required; and correspondingly update the HARQ information.

For example, in this embodiment, when a data packet of the network device arrives at the terminal device, the terminal device performs error detection on the data packet. If the data packet is correctly received, the terminal device returns an acknowledgment (ACK) signal to the network device. In this way, the network device does not need to perform retransmission. If the data packet is not correctly received, a negative acknowledgment (NACK) signal is returned. In this way, the network device needs to retransmit the data packet. Therefore, the network device may update the HARQ information based on the obtained ACK/NACK information.

Step 133: Obtain the user buffer status information and the historical throughput information.

Optionally, on one hand, the network device may obtain the stored user buffer status information and the stored historical throughput information through querying. On the other hand, the network device may alternatively receive the user buffer status information and the historical throughput information synchronized by the another network device. This is because after obtaining the user buffer status information and the historical throughput information, a network device in the communication system may synchronize the user buffer status information and the historical throughput information to the another network device. In this way, repeated detection or querying performed by the another network device can be avoided, and load of the another network device is reduced.

A specific manner in which the network device obtains the network status information, the ACK/NACK information, the user buffer status information, and the historical throughput information is not limited in this embodiment, and may be determined based on an actual situation. Details are not described herein again.

Correspondingly, the foregoing step 72 may be replaced with the following step 134:

Step 134: Obtain the scheduling policy based on the network status information, the user buffer status information, the historical throughput information, the HARQ information, and the deep neural network.

Correspondingly, after step 134, the method may further include the following step:

Step 135: Send the scheduling policy to the at least one terminal device.

Optionally, in this embodiment, after the network device obtains the scheduling policy based on the determined system status information such as the network status information, the HARQ information, the user buffer status information, and the historical throughput information, and the deep neural network, the network device may send the scheduling policy to the at least one terminal device that needs to communicate with the network device. In this way, the at least one terminal device may communicate with the network device according to the scheduling policy.

According to the scheduling method in the communication system provided in this embodiment, for downlink transmission in the communication system, the network device may obtain the network status information and the ACK/NACK information that are determined by the at least one terminal device, update the HARQ information based on the ACK/NACK information, and obtain the user buffer status information and the historical throughput information. That is, the system status information of the communication system is obtained. This lays a foundation for determining a reasonable scheduling policy. Further, the network device sends the determined scheduling policy to the at least one terminal device. In this way, the network device may communicate with the terminal device based on the same scheduling policy, thereby improving the system stability.

Figure 14:
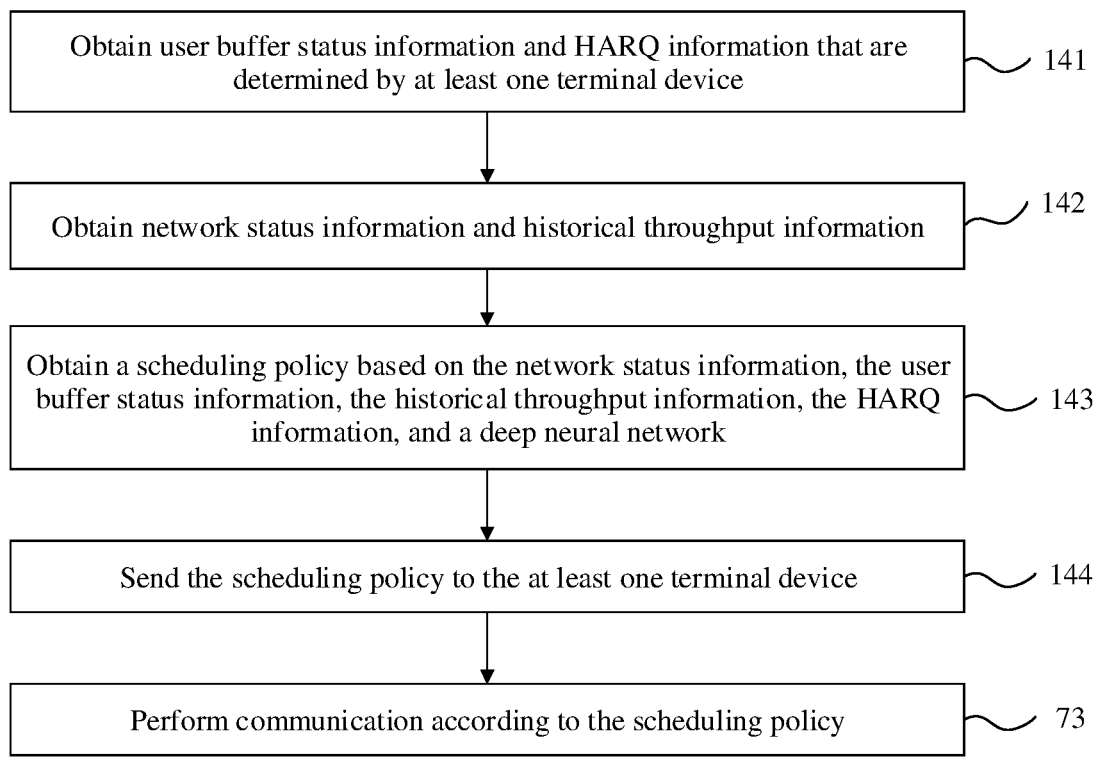
FIG. 14 is a schematic flowchart of Embodiment 8 of a scheduling method in a communication system according to an embodiment.

For example, in the existing cellular wireless network, when the communication device is the network device, and the terminal device performs the uplink transmission with the network device, the scheduling method in the communication system may be implemented by using an embodiment shown in FIG. 14.

For example, FIG. 14 is a schematic flowchart of Embodiment 8 of the scheduling method in the communication system according to an embodiment. As shown in FIG. 14, step 71 may be implemented by using the following steps:

Step 141: Obtain the user buffer status information and the HARQ information that are determined by the at least one terminal device.

Optionally, in an uplink transmission process of the communication system, each terminal device may determine the user buffer status information and the HARQ information that are maintained by the terminal device.

As an example, the at least one terminal device may directly report the determined user buffer status information and the determined HARQ information to the network device, so that the network device directly receives the user buffer status information and the HARQ information that are determined by the at least one terminal device.

As another example, after the terminal device reports the determined user buffer status information and the determined HARQ information to a network device in the communication system, the network device synchronizes the received user buffer status information and the received HARQ information to the another network device in the communication system. Therefore, the network device may obtain the user buffer status information and the HARQ information of the at least one terminal device from the another network device.

Step 142: Obtain the network status information and the historical throughput information.

Optionally, on one hand, the network device may obtain the network status information of the communication system by detecting the channel status of a current network and obtain the historical throughput information through querying. On the other hand, the network device may alternatively receive the user buffer status information and the historical throughput information that are synchronized by the another network device. For example, after obtaining the user buffer status information and the historical throughput information, a network device in the communication system may synchronize the user buffer status information and the historical throughput information to the another network device. In this way, the another network device in the communication system can obtain the current network status information and the historical throughput information of the communication system without self-detection or querying.

A specific manner in which the network device obtains the user buffer status information, the HARQ information, the network status information, and the historical throughput information is not limited in this embodiment, and may be determined based on an actual situation. Details are not described herein again.

Correspondingly, the foregoing step 72 may be replaced with the following step 143:

Step 143: Obtain the scheduling policy based on the network status information, the user buffer status information, the historical throughput information, the HARQ information, and the deep neural network.

Correspondingly, after step 143, the method may further include the following step:

Step 144: Send the scheduling policy to the at least one terminal device.

In this embodiment, similar to step 135 in the embodiment shown in FIG. 13, after the network device obtains the scheduling policy based on the determined system status information such as the network status information, the HARQ information, the user buffer status information, and the historical throughput information, the network device may send the scheduling policy to the at least one terminal device that needs to communicate with the network device. In this way, the at least one terminal device may communicate with the network device according to the scheduling policy.

According to the scheduling method in the communication system provided in this embodiment, for the uplink transmission in the communication system, the network device may obtain the user buffer status information and the HARQ information that are determined by the at least one terminal device and obtain the network status information and the historical throughput information. That is, the system status information of the communication system is obtained. This lays the foundation for determining the reasonable scheduling policy. Further, the network device sends the determined scheduling policy to the at least one terminal device. In this way, the network device may communicate with the terminal device based on the same scheduling policy, thereby improving the system stability.

Optionally, the communication device in this embodiment may be used in a plurality of scenarios. In addition to the centralized scheduling manner in the embodiments shown in FIG. 13 and FIG. 14, the communication device in this embodiment may be used in a new radio (NR) scenario and scenarios such as grant-free transmission, user centric no cell (UCNC), and device-to-device (D2D) communication that may occur in a future network.

As another example, the communication device may be the terminal device, that is, the deep neural network may be integrated in the scheduler, and the scheduler may be implemented in the terminal device. That a capability (energy, a computing resource, and the like) of the terminal device is limited is considered, and global information of the system cannot be obtained, The terminal device may implement the scheduling method in the communication system by using the embodiment shown in FIG. 15 and the embodiment shown in FIG. 16.

Figure 15:
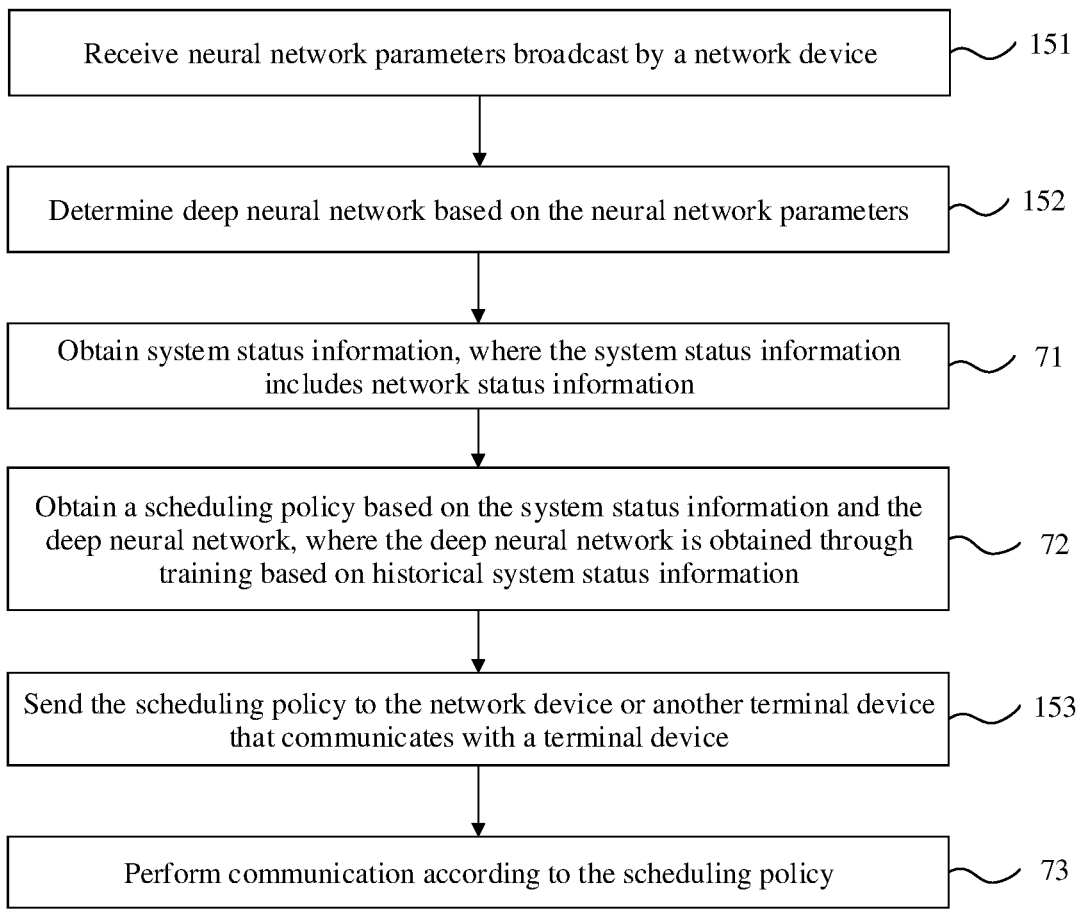
FIG. 15 is a schematic flowchart of Embodiment 9 of a scheduling method in a communication system according to an embodiment.

For example, FIG. 15 is a schematic flowchart of Embodiment 9 of the scheduling method in the communication system according to an embodiment. As shown in FIG. 15, before the foregoing step 71, the method may further include the following steps:

Step 151: Receive neural network parameters broadcast by the network device.

In this embodiment, the network device (a central controller) of the communication system is responsible for collecting the system status information, and training the deep neural network based on all the collected historical system status information. The network device may broadcast the neural network parameters corresponding to the trained deep neural network to all terminal devices in the communication system, so that the terminal device can receive the neural network parameters broadcast by the network device.

Step 152: Determine the deep neural network based on the neural network parameters.

Optionally, in this embodiment, the terminal device does not need to train the deep neural network, but only needs to update, based on radio environment information of the terminal device, the neural network parameters received from the network device, to obtain the deep neural network used to determine the scheduling policy.

For example, the terminal device may obtain the network status information, the user buffer status, the HARQ information, the historical throughput information, and the like through detection or querying, to obtain the current system status information of the communication system. The system status information is input into the determined deep neural network to obtain the scheduling weight or the scheduling policy. If the scheduling weight is obtained, the scheduling policy is further determined.

Correspondingly, after the foregoing step 72, the method may further include the following step:

Step 153: Send the scheduling policy to the network device or the another terminal device that communicates with the terminal device.

Optionally, in this embodiment, after determining the scheduling policy based on the obtained system status information and the deep neural network, the terminal device may send the scheduling policy to the network device or the another terminal device that communicates with the terminal device (for a UCNC or D2D scenario), so that the network device or the another terminal device that communicates with the terminal device may communicate with the terminal device based on the received scheduling policy, for example, implement the data transmission.

According to the scheduling method in the communication system provided in this embodiment, the terminal device may receive the neural network parameters broadcast by the network device; determine the deep neural network based on the neural network parameters; and after obtaining the scheduling policy based on the system status information and the deep neural network, send the scheduling policy to the network device or the another terminal device that communicates with the terminal device. In this solution, the deep neural network is trained on a network device side. In this way, the obtained scheduling policy is reasonable, and a capability requirement for the terminal device is reduced. The performance of the communication system is good.

Figure 16:
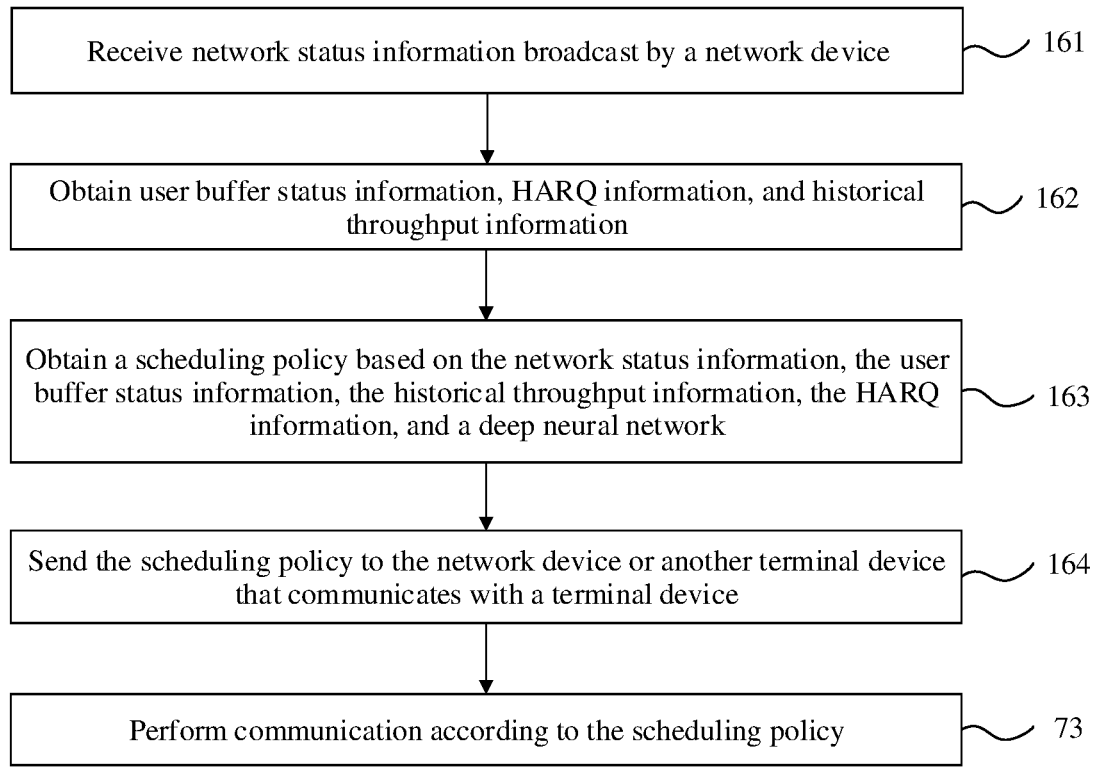
FIG. 16 is a schematic flowchart of Embodiment 10 of a scheduling method in a communication system according to an embodiment.

For example, FIG. 16 is a schematic flowchart of Embodiment 10 of the scheduling method in the communication system according to an embodiment. As shown in FIG. 16, the foregoing step 71 may be implemented by using the following steps:

Step 161: Receive the network status information broadcast by the network device.

In this embodiment, the network device (the central controller) in the communication system is responsible for collecting the network status information, and broadcasting the obtained network status information, so that the terminal device receives the network status information broadcast by the network device.

For example, the network status information may include, but is not limited to, channel information, interference information, and the like, and may further include other parameters that reflect a network status. Details are not described herein again.

Step 162: Obtain the user buffer status information, the HARQ information, and the historical throughput information.

In this embodiment, the terminal device may obtain some status information of the terminal device such as the user buffer status information, the HARQ information, and the historical throughput information.

Further, the terminal device may obtain the scheduling result based on the obtained user buffer status information, the HARQ information, the historical throughput information, the network status information received from the network device, and the deep neural network obtained through training based on the historical system status information. It should be noted that, in this embodiment, the deep neural network is obtained by the terminal device through training based on the obtained historical system status information.

Correspondingly, the foregoing step 72 may be replaced with the following step 163:

Step 163: Obtain the scheduling policy based on the network status information, the user buffer status information, the historical throughput information, the HARQ information, and the deep neural network.

Correspondingly, after step 163, the method may further include the following step:

Step 164: Send the scheduling policy to the network device or the another terminal device that communicates with the terminal device.

An implementation of this step is similar to that of step 153 in the embodiment shown in FIG. 15. For details, refer to the descriptions in the foregoing embodiments. Details are not described herein again.

According to the scheduling method in the communication system provided in this embodiment, the terminal device receives the network status information broadcast by the network device; obtains the user buffer status information, the HARQ information, and the historical throughput information; and after obtaining the scheduling policy, sends the scheduling policy to the network device or the another terminal device that communicates with the terminal device. In this solution, the deep neural network is trained and used on a terminal device side, so that the scheduling policy that balances the throughput information and the fairness can be obtained, thereby improving the performance of the communication system.

Figure 17A:
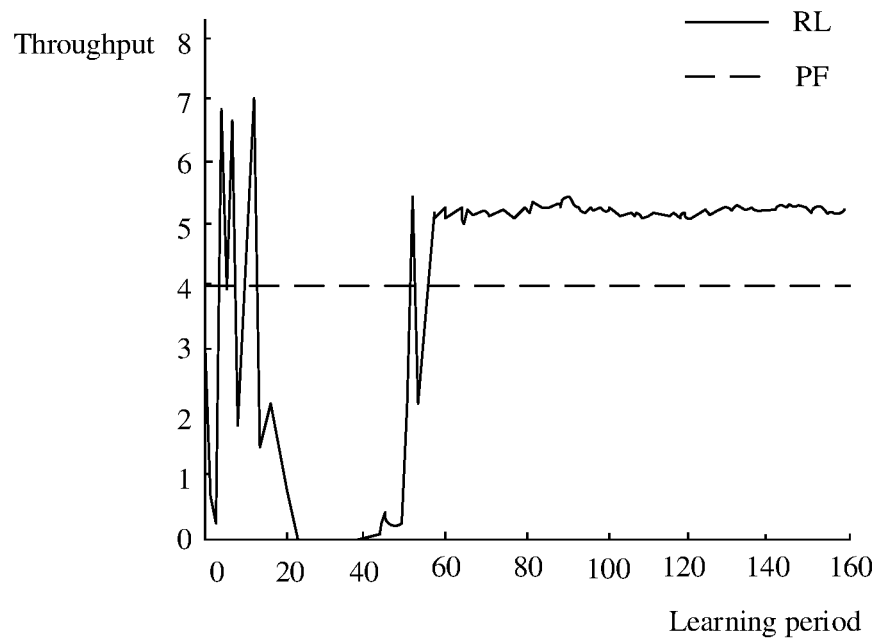
FIG. 17A is a schematic diagram of throughput performance comparison between an RL algorithm and a PF algorithm.
Figure 17B:
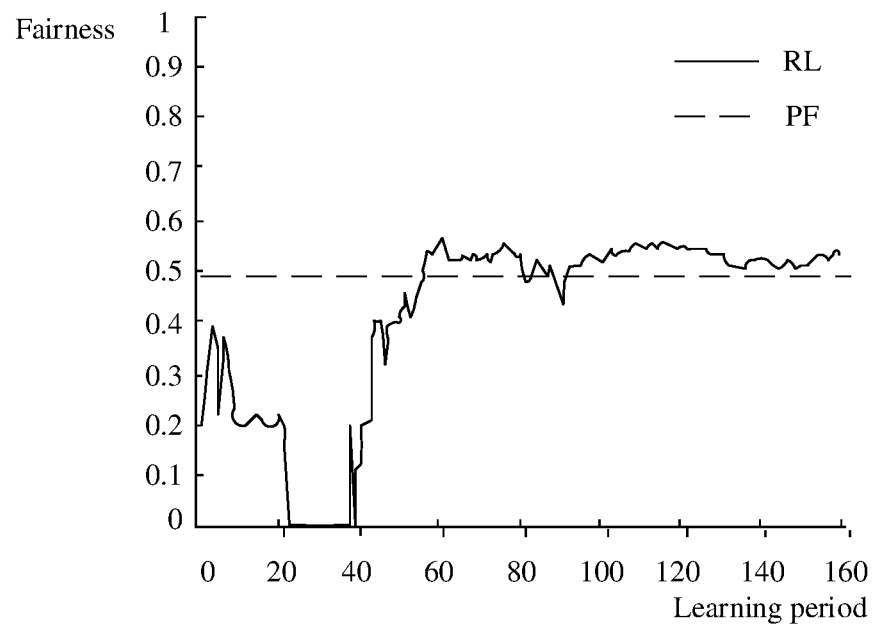
FIG. 17B is a schematic diagram of fairness performance comparison between an RL algorithm and a PF algorithm.

For example, it is assumed that for a communication system in which a single base station has five users. FIG. 17A is a schematic diagram of throughput performance comparison between an RL algorithm and a PF algorithm. FIG. 17B is a schematic diagram of fairness performance comparison between the RL algorithm and the PF algorithm. Both horizontal axes of FIG. 17A and FIG. 17B represent a learning period of reinforcement learning (RL) and may be represented by epoch. One epoch is equal to a time at which 500 times of training are performed by using all samples in a training set. A vertical axis of FIG. 17A represents throughput in a unit of megabits per second (Mbps). A vertical axis of FIG. 17B represents fairness. The fairness is between 0 and 1 and may be calculated by using a Jain formula.

As shown in FIG. 17A, after the communication system is trained for a time period, throughput information of a scheduling policy obtained by using a RL learning manner is higher than throughput information of a scheduling policy of a proportional fairness algorithm in the conventional technology. As shown in FIG. 17B, after the communication system is trained for the time period, fairness information of the scheduling policy obtained by using the reinforcement learning manner is also slightly better than fairness information of the scheduling policy of the proportional fairness algorithm in the conventional technology. Therefore, it can be understood that the scheduling policy obtained in this embodiment exceeds the PF algorithm in the conventional technology in terms of both throughput performance and fairness performance, thereby implementing a balance between the throughput information and the fairness information.

Figure 18:
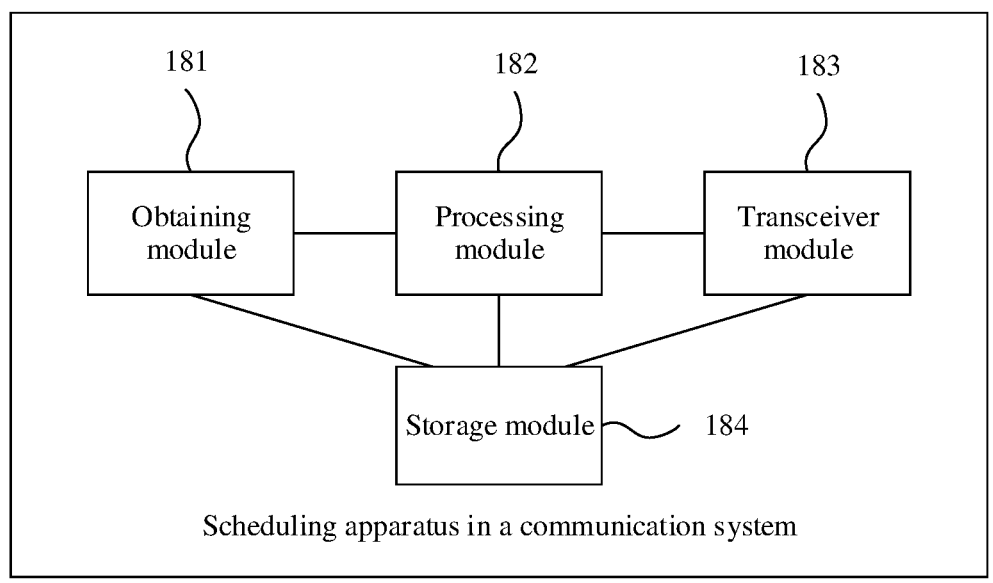
FIG. 18 is a schematic structural diagram of Embodiment 1 of a scheduling apparatus in a communication system according to an embodiment.

FIG. 18 is a schematic structural diagram of Embodiment 1 of a scheduling apparatus in a communication system according to an embodiment. The apparatus may be integrated in a communication device or may be implemented by using a communication device. As shown in FIG. 18, the apparatus may include an obtaining module 181, a processing module 182, and a transceiver module 183.

The obtaining module 181 is configured to obtain system status information, where the system status information includes network status information.

The processing module 182 is configured to obtain a scheduling policy based on the system status information and a deep neural network, where the deep neural network is obtained through training based on historical system status information, and the historical system status information includes system status information in all scheduling periods before a current scheduling period.

The transceiver module 183 is configured to perform communication according to the scheduling policy.

For example, in a possible implementation of this embodiment, the system status information further includes historical throughput information and user buffer status information.

Optionally, the processing module 182 is configured to: determine estimated throughput information based on the network status information and the user buffer status information; input the estimated throughput information and the historical throughput information into the deep neural network to obtain a scheduling weight; and determine the scheduling policy based on the scheduling weight.

For example, in the foregoing possible implementation of this embodiment, the system status information further includes HARQ information.

The processing module 182 is configured to determine the scheduling policy based on the scheduling weight and the HARQ information.

For example, in another possible implementation of this embodiment, the processing module 182 is configured to: determine estimated throughput information based on the network status information and the user buffer status information; and input the estimated throughput information and the historical throughput information into the deep neural network to obtain the scheduling policy.

For example, in still another possible implementation of this embodiment, the processing module 182 is configured to input the system status information into the deep neural network to obtain the scheduling policy.

For example, in still another possible implementation of this embodiment, the processing module 182 is configured to input the system status information into the deep neural network to obtain a scheduling weight and obtain the scheduling policy based on the scheduling weight.

For example, in any one of the foregoing possible implementations of this embodiment, the system status information input into the deep neural network further includes HARQ information.

For example, in any one of the foregoing possible implementations s of this embodiment, the obtaining module 181 is further configured to obtain current system throughput information, current fairness parameter information, and updated system status information that are obtained after the scheduling policy is executed.

The processing module 182 is further configured to determine payoff information based on at least one of the following parameters: the current system throughput information, the current fairness parameter information, a system packet loss rate, and a system delay, where the payoff information is used to adjust a decision of the deep neural network in a next scheduling period.

Optionally, as shown in FIG. 18, the apparatus further includes a storage module 184.

The storage module 184 is configured to store the system status information, the scheduling policy, the updated system status information, and the payoff information, where the system status information, the scheduling policy, the updated system status information, and the payoff information are used to update the deep neural network.

Optionally, in a possible implementation of this embodiment, the communication device is a network device; and the obtaining module 181 is configured to obtain the network status information and acknowledgment or non-acknowledgment (ACK/NACK) information that are determined by at least one terminal device, update the HARQ information based on the ACK/NACK information, and obtain the user buffer status information and the historical throughput information.

Optionally, in another possible implementation of this embodiment, the communication device is a network device; and the obtaining module 181 is configured to obtain the user buffer status information and the HARQ information that are determined by at least one terminal device, and obtain the network status information and the historical throughput information.

Optionally, in any one of the foregoing possible implementations, the transceiver module 183 is further configured to send the scheduling policy to the at least one terminal device.

Optionally, in still another possible implementation of this embodiment, the communication device is a terminal device, and the transceiver module 183 is further configured to: before the obtaining module 181 obtains the system status information, receive neural network parameters broadcast by a network device.

The processing module 182 is further configured to determine the deep neural network based on the neural network parameters.

Optionally, in yet another possible implementation of this embodiment, the communication device is a terminal device; and the obtaining module 181 is configured to receive, by using the transceiver module 183, the network status information broadcast by a network device, and obtain the user buffer status information, the HARQ information, and the historical throughput information.

Optionally, in any one of the foregoing possible implementations, the transceiver module 183 is further configured to send the scheduling policy to the network device or another terminal device that communicates with the terminal device.

The scheduling apparatus in the communication system in this embodiment may be configured to execute the implementation solutions of the method embodiments shown in FIG. 7A to FIG. 16. Specific implementations and effects are similar, and details are not described herein again.

It should be noted and understood that division into the modules of the foregoing apparatus is merely logic function division. During an actual implementation, some or all of the modules may be integrated into one physical entity, or the modules may be physically separated. In addition, all these modules may be implemented in a form of software invoked by a processing element or may be implemented in a form of hardware. Alternatively, some modules may be implemented in a form of software invoked by a processing element, and some modules are implemented in a form of hardware.

For example, the processing module may be a separately disposed processing element or may be integrated into a chip of the foregoing apparatus for implementation. In addition, the processing module may alternatively be stored in a memory of the foregoing apparatus in a form of program code and is invoked by a processing element of the foregoing apparatus to perform a function of the processing module. Implementations of other modules are similar to the implementation of the processing module.

In addition, all or some of the modules may be integrated together or may be implemented independently. The processing element described herein may be an integrated circuit and has a signal processing capability. In an implementation process, steps in the foregoing methods or the foregoing modules may be completed by using a hardware integrated logical circuit in the processing element, or by using instructions in a form of software.

For example, the foregoing modules may be configured as one or more integrated circuits for implementing the foregoing methods, such as one or more application-specific integrated circuits (ASIC), one or more microprocessors (DSP), or one or more field programmable gate arrays (FPGA). For another example, when one of the foregoing modules is implemented in a form of scheduling program code by the processing element, the processing element may be a general-purpose processor, for example, a central processing unit (CPU) or another processor that can invoke the program code. For still another example, these modules may be integrated together and implemented in a form of a system-on-a-chip (SoC).

All or some of the foregoing embodiments may be implemented by using software, hardware, firmware, or any combination thereof. When the software is used to implement the embodiments, the embodiments may be implemented entirely or partially in a form of a computer program product. The computer program product includes one or more computer instructions. When the computer instructions are loaded and executed on a computer, the procedures or functions according to the embodiments are all or partially generated. The computer may be a general-purpose computer, a special-purpose computer, a computer network, or another programmable apparatus. The computer instructions may be stored in a readable storage medium or may be transmitted from a readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Figure 19:
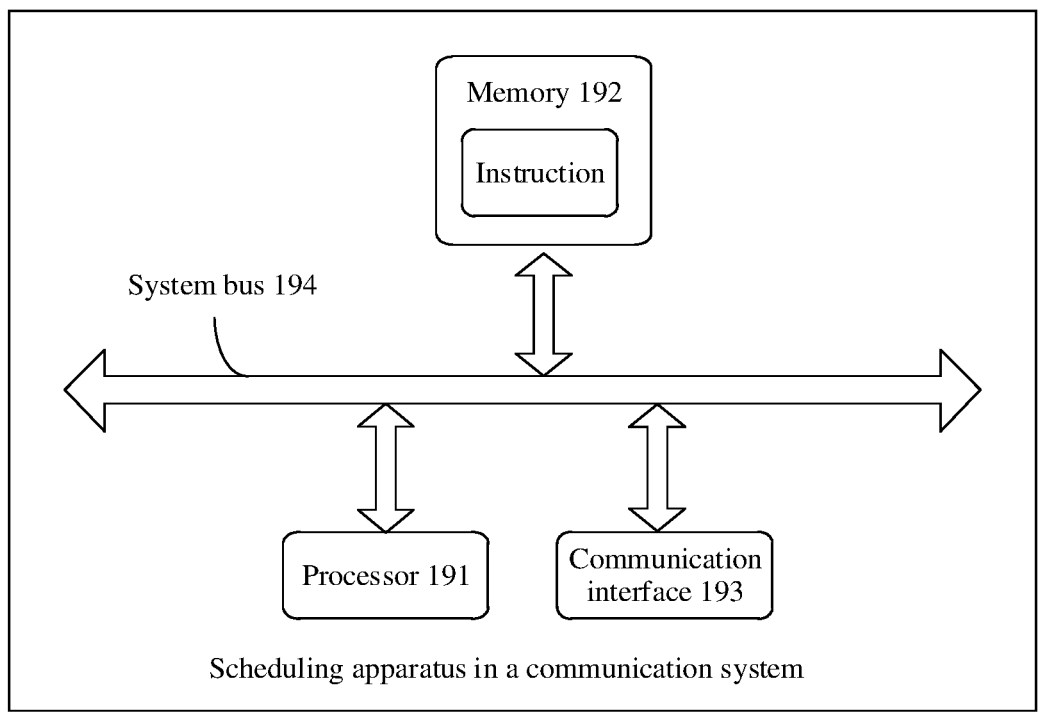
FIG. 19 is a schematic structural diagram of Embodiment 2 of a scheduling apparatus in a communication system according to an embodiment.

FIG. 19 is a schematic structural diagram of Embodiment 2 of the scheduling apparatus in the communication system according to an embodiment. The apparatus may be integrated in the communication device or may be implemented by using the communication device.

In a hardware implementation, the transceiver module 183 may be a transceiver. The transceiver constitutes a communication interface. In addition, the transceiver may be implemented by a transmitter and a receiver that have independent functions. Both the transmitter and the receiver may be implemented in a form of an antenna or the like. This is not limited in this embodiment. The obtaining module 181 and the processing module 182 may be a processor, and the storage module 184 may be a memory.

As shown in FIG. 19, the apparatus may include a processor 191, a memory 192, a communication interface 193, and a system bus 194. The memory 192 and the communication interface 193 are connected to the processor 191 and communicate with each other through the system bus 194. The memory 192 is configured to store computer-executable instructions. The communication interface 193 is configured to communicate with another device. When executing the computer-executable instructions, the processor 191 implements the methods in the method embodiments shown in FIG. 7A to FIG. 16.

Optionally, the processor 191 and the memory 192 may be integrated for implementation or may be implemented separately. Specific implementation forms of the processor 191 and the memory 192 may be determined based on an actual situation. This is not limited in this embodiment.

The system bus in FIG. 19 may be a peripheral component interconnect (PCI) bus, an extended industry standard architecture (EISA) bus, or the like. The system bus may be classified into an address bus, a data bus, a control bus, and the like. For ease of representation, only one thick line is used to represent the bus in the figure, but this does not mean that there is only one bus or only one type of bus. The communication interface is configured to implement communication between a database access apparatus and another device (for example, a client, a read/write database, or a read-only database). The memory may include a random access memory (RAM), or may include a non-volatile memory, for example, at least one magnetic disk memory.

The foregoing processor may be a general-purpose processor, including a central processing unit CPU, a network processor (NP), and the like; or may be a digital signal processor DSP, an application-specific integrated circuit ASIC, a field programmable gate array FPGA, or another programmable logical device, discrete gate or transistor logical device, or discrete hardware component.

Optionally, the processor 191 and the memory 192 may alternatively be integrated into an application-specific integrated circuit, and the integrated circuit may further include the communication interface 193. The application-specific integrated circuit may be a processing chip or may be a processing circuit. The communication interface 193 may be a communication interface that includes wireless receiving and sending functions, or may be an interface of a digital signal that is input after a received radio signal is processed by another processing circuit, or may be a software or hardware interface that communicates with another module. The memory 192 stores code and data. The memory 192 is coupled to the processor 191. The processor 191 runs the code in the memory 192, to enable the chip to perform the methods in the method embodiments shown in FIG. 7A to FIG. 16.

Optionally, an embodiment further provides a storage medium. The storage medium stores instructions. When the instructions are run on a computer, the computer is enabled to perform the implementation solutions of the terminal device in the method embodiments shown in FIG. 7A to FIG. 16.

An embodiment further provides a program product. The program product includes a computer program; the computer program is stored in a storage medium; at least one processor may read the computer program from the storage medium; and when executing the computer program, the at least one processor can implement the methods in the embodiments shown in FIG. 7A to FIG. 16.

In the embodiments, "at least one" means one or more, and "a plurality of" means two or more. The term "and/or" describes an association relationship between associated objects and represents that three relationships may exist. For example, A and/or B may represent the following cases: only A exists, both A and B exist, and only B exists, where A and B may be singular or plural. The character "/" generally indicates an "or" relationship between the associated objects. In a formula, the character "l" indicates a "division" relationship between the associated objects. The term "at least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It may be understood that numerical symbols in the embodiments are differentiated merely for ease of description, but are not used to limit the scope of the embodiments.

It should be understood that sequence numbers of the foregoing processes do not mean execution sequences in the embodiments. The execution sequences of the processes should be determined based on functions and internal logic of the processes and should not be construed as any limitation on the implementation processes of the embodiments.

What is claimed is:

1. A scheduling method in a communication system, wherein the method is applicable to a communication device, and the method comprises:
obtaining system status information, wherein the system status information comprises network status information;
obtaining a scheduling policy based on the system status information and a deep neural network, wherein the deep neural network is obtained through training based on historical system status information, and the historical system status information comprises system status information in all scheduling periods before a current scheduling period;

performing communication according to the scheduling policy;

obtaining current system throughput information, current fairness parameter information, and updated system status information that are obtained after the scheduling policy is executed; and determining payoff information based on at least one of: the current system throughput information, the current fairness parameter information, a system packet loss rate, and a system delay, wherein the payoff information is used to adjust a decision of the deep neural network in a next scheduling period;

wherein the scheduling policy controls the media access control layer of the communication device.

2. The method according to claim 1, wherein the system status information further comprises historical throughput information and user buffer status information.

3. The method according to claim 2, wherein the obtaining of a scheduling policy based on the system status information and a deep neural network comprises:

determining estimated throughput information based on the network status information and the user buffer status information;

inputting the estimated throughput information and the historical throughput information into the deep neural network to obtain a scheduling weight; and determining the scheduling policy based on the scheduling weight.

4. The method according to claim 3, wherein the system status information further comprises hybrid automatic repeat request (HARQ) information; and the determining of the scheduling policy based on the scheduling weight comprises:

determining the scheduling policy based on the scheduling weight and the HARQ information.

5. The method according to claim 2, wherein the obtaining of a scheduling policy based on the system status information and a deep neural network comprises:

determining estimated throughput information based on the network status information and the user buffer status information; and inputting the estimated throughput information and the historical throughput information into the deep neural network to obtain the scheduling policy.

6. The method according to claim 2, wherein the obtaining of a scheduling policy based on the system status information and a deep neural network comprises:

inputting the system status information into the deep neural network to obtain the scheduling policy.

7. The method according to claim 2, wherein the obtaining of a scheduling policy based on the system status information and a deep neural network comprises:

inputting the system status information into the deep neural network to obtain a scheduling weight; and determining the scheduling policy based on the scheduling weight.

8. The method according to claim 3, wherein the system status information input into the deep neural network further comprises hybrid automatic repeat request (HARQ) information.

9. The method according to claim 1, further comprising:

storing the system status information, the scheduling policy, the updated system status information, and the payoff information, wherein the system status information, the scheduling policy, the updated system status information, and the payoff information are used to update the deep neural network.

10. A scheduling apparatus in a communication system, comprising at least one processor and at least one non-transitory memory, wherein the at least one non-transitory memory is configured to store a computer program, and when the computer program is run on the at least one processor, the at least one processor is configured to:

obtain system status information, wherein the system status information comprises network status information;

obtain a scheduling policy based on the system status information and a deep neural network, wherein the deep neural network is obtained through training based on historical system status information, and the historical system status information comprises system status information in all scheduling periods before a current scheduling period; and perform communication according to the scheduling policy;

obtain current system throughput information, current fairness parameter information, and updated system status information that are obtained after the scheduling policy is executed; and determine payoff information based on at least one of: the current system throughput information, the current fairness parameter information, a system packet loss rate, and a system delay, wherein the payoff information is used to adjust a decision of the deep neural network in a next scheduling period;

wherein the scheduling policy controls the media access control layer of the communication device.

11. The apparatus according to claim 10, wherein the system status information further comprises historical throughput information and user buffer status information.

12. The apparatus according to claim 11, wherein the at least one processor is configured to: determine estimated throughput information based on the network status information and the user buffer status information; input the estimated throughput information and the historical throughput information into the deep neural network to obtain a scheduling weight; and determine the scheduling policy based on the scheduling weight.

13. The apparatus according to claim 12, wherein the system status information further comprises hybrid automatic repeat request (HARQ) information; and the processing module is configured to determine the scheduling policy based on the scheduling weight and the HARQ information.

14. The apparatus according to claim 11, wherein the at least one processor is configured to: determine estimated throughput information based on the network status information and the user buffer status information; and input the estimated throughput information and the historical throughput information into the deep neural network to obtain the scheduling policy.

15. The apparatus according to claim 11, wherein the at least one processor is configured to input the system status information into the deep neural network to obtain the scheduling policy.

16. The apparatus according to claim 11, wherein the at least one processor is configured to input the system status information into the deep neural network to obtain a scheduling weight; and obtain the scheduling policy based on the scheduling weight.

17. The apparatus according to claim 12, wherein the system status information input to the deep neural network further comprises hybrid automatic repeat request (HARQ) information.

18. The apparatus according to claim 10, wherein the at least one non-transitory memory is configured to store the system status information, the scheduling policy, the updated system status information, and the payoff information; and the system status information, the scheduling policy, the updated system status information, and the payoff information are used to update the deep neural network.

* * * * *